(12) United States Patent
Navar et al.

(10) Patent No.: US 8,769,558 B2
(45) Date of Patent: Jul. 1, 2014

(54) DISCOVERY AND ANALYTICS FOR EPISODIC DOWNLOADED MEDIA

(75) Inventors: Murgesh Navar, San Jose, CA (US); Andrey Yruski, San Francisco, CA (US); Peter Shafton, San Francisco, CA (US); George McMullen, San Francisco, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 85 days.

(21) Appl. No.: 12/370,531

(22) Filed: Feb. 12, 2009

(65) Prior Publication Data

US 2009/0204481 A1   Aug. 13, 2009

Related U.S. Application Data

(60) Provisional application No. 61/028,185, filed on Feb. 12, 2008.

(51) Int. Cl.
*H04H 60/32* (2008.01)
(52) U.S. Cl.
USPC ............................................................ 725/14
(58) Field of Classification Search
CPC .. H04N 21/44222; H04H 60/35; H04H 60/43
USPC ........................................................ 725/14
See application file for complete search history.

(56) References Cited

U.S. PATENT DOCUMENTS

| | | |
|---|---|---|
| 4,521,021 A | 6/1985 | Dixon |
| 4,542,897 A | 9/1985 | Melton et al. |
| 4,734,690 A | 3/1988 | Waller |
| 4,807,158 A | 2/1989 | Blanton et al. |
| 4,905,168 A | 2/1990 | McCarthy et al. |
| 4,926,255 A | 5/1990 | Von Kohorn |
| 4,969,036 A | 11/1990 | Bhanu et al. |
| 5,014,234 A | 5/1991 | Edwards, Jr. |
| 5,083,271 A | 1/1992 | Thacher et al. |
| 5,105,184 A | 4/1992 | Pirani et al. |

(Continued)

FOREIGN PATENT DOCUMENTS

| | | |
|---|---|---|
| AU | 9959097 | 11/1999 |
| CA | 2106122 | 3/1994 |

(Continued)

OTHER PUBLICATIONS

"Statement in Accordance with the Notice from the European Patent Office dated Oct. 1, 2007 Concerning Business Methods" Nov. 1, 2007, XP002456252.

(Continued)

*Primary Examiner* — Nathan Flynn
*Assistant Examiner* — Alfonso Castro
(74) *Attorney, Agent, or Firm* — Lewis Roca Rothgerber LLP

(57) ABSTRACT

Matching advertising information to media content/user combinations in which information and content are delivered to a user over a network is disclosed. Content providers and advertisers may find out about the offerings of one another as well as user profiles and preferences thereby facilitating agreement of ads with content and users. Viral syndication is also facilitated by allowing the user to share downloaded media with friends and associates. Users may bookmark, share, and/or request/find more content with similarities to the downloaded content with various analytics being reported with respect to the same.

16 Claims, 11 Drawing Sheets

(56) References Cited

U.S. PATENT DOCUMENTS

| | | |
|---|---|---|
| 5,227,874 A | 7/1993 | Von Kohorn |
| 5,231,568 A | 7/1993 | Cohen et al. |
| 5,283,731 A | 2/1994 | Lalonde et al. |
| 5,305,195 A | 4/1994 | Murphy |
| 5,305,389 A | 4/1994 | Palmer |
| 5,319,454 A | 6/1994 | Schutte |
| 5,347,632 A | 9/1994 | Filepp et al. |
| 5,373,440 A | 12/1994 | Cohen et al. |
| 5,377,997 A | 1/1995 | Wilden et al. |
| 5,446,919 A | 8/1995 | Wilkins |
| 5,462,275 A | 10/1995 | Lowe et al. |
| 5,497,479 A | 3/1996 | Hornbuckle |
| 5,512,935 A | 4/1996 | Majeti et al. |
| 5,526,041 A | 6/1996 | Glatt |
| 5,539,450 A | 7/1996 | Handelman |
| 5,548,645 A | 8/1996 | Ananda |
| 5,564,038 A | 10/1996 | Grantz et al. |
| 5,565,909 A | 10/1996 | Thibadeau et al. |
| 5,572,643 A | 11/1996 | Judson |
| 5,592,212 A | 1/1997 | Handelman |
| 5,630,757 A | 5/1997 | Gagin et al. |
| 5,636,346 A | 6/1997 | Saxe |
| 5,663,757 A | 9/1997 | Morales |
| 5,684,526 A | 11/1997 | Yoshinobu |
| 5,697,844 A | 12/1997 | Von Kohorn |
| 5,699,497 A | 12/1997 | Erdahl et al. |
| 5,707,289 A | 1/1998 | Watanabe et al. |
| 5,712,979 A | 1/1998 | Graber et al. |
| 5,721,827 A | 2/1998 | Logan et al. |
| 5,724,521 A | 3/1998 | Dedrick |
| 5,737,619 A | 4/1998 | Judson |
| 5,748,867 A | 5/1998 | Cosman et al. |
| 5,751,956 A | 5/1998 | Kirsch |
| 5,758,068 A | 5/1998 | Brandt et al. |
| 5,758,257 A | 5/1998 | Herz et al. |
| 5,771,347 A | 6/1998 | Grantz et al. |
| 5,774,170 A | 6/1998 | Hite et al. |
| 5,794,210 A | 8/1998 | Goldhaber et al. |
| 5,798,519 A | 8/1998 | Vock et al. |
| 5,805,815 A | 9/1998 | Hill |
| 5,822,523 A | 10/1998 | Rothschild et al. |
| 5,848,396 A | 12/1998 | Gerace |
| 5,855,008 A | 12/1998 | Goldhaber et al. |
| 5,857,149 A | 1/1999 | Suzuki |
| 5,860,073 A | 1/1999 | Ferrel et al. |
| 5,867,208 A | 2/1999 | McLaren |
| 5,876,286 A | 3/1999 | Lee |
| 5,879,235 A | 3/1999 | Kaneko et al. |
| 5,903,816 A | 5/1999 | Broadwin et al. |
| 5,910,987 A | 6/1999 | Ginter et al. |
| 5,911,582 A | 6/1999 | Redford |
| 5,916,024 A | 6/1999 | Von Kohorn |
| 5,917,725 A | 6/1999 | Thacher et al. |
| 5,929,850 A | 7/1999 | Broadwin et al. |
| 5,937,037 A | 8/1999 | Kamel et al. |
| 5,946,646 A | 8/1999 | Schena et al. |
| 5,946,664 A | 8/1999 | Ebisawa |
| 5,948,061 A | 9/1999 | Merriman et al. |
| 5,964,660 A | 10/1999 | James et al. |
| 5,970,143 A | 10/1999 | Schneier et al. |
| 5,974,398 A | 10/1999 | Hanson et al. |
| 5,987,511 A | 11/1999 | Elixmann et al. |
| 5,991,735 A | 11/1999 | Gerace |
| 6,005,602 A | 12/1999 | Matthews, III |
| 6,012,984 A | 1/2000 | Roseman |
| 6,015,348 A | 1/2000 | Lambright et al. |
| 6,020,883 A | 2/2000 | Herz et al. |
| 6,024,643 A | 2/2000 | Begis |
| 6,026,368 A | 2/2000 | Brown et al. |
| 6,029,046 A | 2/2000 | Khan et al. |
| 6,036,601 A | 3/2000 | Heckel |
| 6,047,289 A | 4/2000 | Thorne et al. |
| 6,088,722 A | 7/2000 | Herz et al. |
| 6,108,637 A | 8/2000 | Blumenau |
| 6,113,494 A | 9/2000 | Lennert |
| 6,119,098 A | 9/2000 | Guyot et al. |
| 6,149,519 A | 11/2000 | Osaki et al. |
| 6,151,631 A | 11/2000 | Ansell et al. |
| 6,165,070 A | 12/2000 | Nolte et al. |
| 6,179,713 B1 | 1/2001 | James et al. |
| 6,181,988 B1 | 1/2001 | Schneider et al. |
| 6,196,920 B1 | 3/2001 | Spaur et al. |
| 6,199,082 B1 | 3/2001 | Ferrel et al. |
| 6,216,129 B1 | 4/2001 | Eldering |
| 6,236,975 B1 | 5/2001 | Boe et al. |
| 6,238,290 B1 | 5/2001 | Tarr et al. |
| 6,251,017 B1 | 6/2001 | Leason et al. |
| 6,263,360 B1 | 7/2001 | Arnold et al. |
| 6,264,555 B1 | 7/2001 | Glazman et al. |
| 6,264,560 B1 | 7/2001 | Goldberg et al. |
| 6,267,672 B1 | 7/2001 | Vance |
| 6,267,675 B1 | 7/2001 | Lee |
| 6,275,854 B1 | 8/2001 | Himmel et al. |
| 6,275,989 B1 | 8/2001 | Broadwin et al. |
| 6,298,348 B1 | 10/2001 | Eldering |
| 6,308,328 B1 | 10/2001 | Bowcutt et al. |
| 6,312,337 B1 | 11/2001 | Edwards et al. |
| 6,320,495 B1 | 11/2001 | Sporgis |
| 6,324,519 B1 | 11/2001 | Eldering |
| 6,343,990 B1 | 2/2002 | Rasmussen et al. |
| 6,346,045 B2 | 2/2002 | Rider et al. |
| 6,366,701 B1 | 4/2002 | Chalom et al. |
| 6,371,850 B1 | 4/2002 | Sonoda |
| 6,379,251 B1 | 4/2002 | Auxier et al. |
| 6,381,362 B1 | 4/2002 | Deshpande et al. |
| 6,385,592 B1 | 5/2002 | Angles et al. |
| 6,390,922 B1 | 5/2002 | Vange et al. |
| 6,393,574 B1 | 5/2002 | Kashiwagi et al. |
| 6,394,899 B1 | 5/2002 | Walker |
| 6,400,996 B1 | 6/2002 | Hoffberg et al. |
| 6,411,936 B1 | 6/2002 | Sanders |
| 6,434,614 B1 | 8/2002 | Blumenau |
| 6,443,843 B1 | 9/2002 | Walker et al. |
| 6,446,130 B1 | 9/2002 | Grapes |
| 6,446,261 B1 | 9/2002 | Rosser |
| 6,456,234 B1 | 9/2002 | Johnson |
| 6,457,010 B1 | 9/2002 | Eldering et al. |
| 6,460,036 B1 | 10/2002 | Herz |
| 6,468,155 B1 | 10/2002 | Zucker et al. |
| 6,470,138 B1 | 10/2002 | Um et al. |
| 6,484,148 B1 | 11/2002 | Boyd |
| 6,484,149 B1 | 11/2002 | Jammes et al. |
| 6,489,955 B1 | 12/2002 | Newhall, Jr. |
| 6,496,826 B1 | 12/2002 | Chowdhury et al. |
| 6,513,160 B2 | 1/2003 | Dureau |
| 6,516,338 B1 | 2/2003 | Landsman et al. |
| 6,529,940 B1 | 3/2003 | Humble |
| 6,530,840 B1 | 3/2003 | Cuomo et al. |
| 6,532,448 B1 | 3/2003 | Higginson et al. |
| 6,539,375 B2 | 3/2003 | Kawasaki |
| 6,539,544 B2 | 3/2003 | Ebisawa |
| 6,553,178 B2 | 4/2003 | Abecassis |
| 6,560,578 B2 | 5/2003 | Eldering |
| 6,563,523 B1 | 5/2003 | Suchocki et al. |
| 6,564,217 B2 | 5/2003 | Bunney et al. |
| 6,595,859 B2 | 7/2003 | Lynn |
| 6,606,746 B1 | 8/2003 | Zdepski et al. |
| 6,611,812 B2 | 8/2003 | Hurtado et al. |
| 6,611,813 B1 | 8/2003 | Bratton |
| 6,611,957 B2 | 8/2003 | Ebisawa |
| 6,612,932 B2 | 9/2003 | Stern |
| 6,615,039 B1 | 9/2003 | Eldering |
| 6,616,533 B1 | 9/2003 | Rashkovskiy |
| 6,625,578 B2 | 9/2003 | Spaur et al. |
| 6,632,138 B1 | 10/2003 | Serizawa et al. |
| 6,640,097 B2 | 10/2003 | Corrigan et al. |
| 6,640,335 B2 | 10/2003 | Ebisawa |
| 6,640,336 B1 | 10/2003 | Ebisawa |
| 6,645,068 B1 | 11/2003 | Kelly et al. |
| 6,654,725 B1 | 11/2003 | Langheinrich et al. |
| 6,656,050 B2 | 12/2003 | Busch et al. |
| 6,659,861 B1 | 12/2003 | Faris et al. |
| 6,663,105 B1 | 12/2003 | Sullivan et al. |
| 6,669,562 B1 | 12/2003 | Shiino |

(56) References Cited

U.S. PATENT DOCUMENTS

| | | |
|---|---|---|
| 6,669,564 B1 | 12/2003 | Young et al. |
| 6,680,746 B2 | 1/2004 | Kawai et al. |
| 6,683,941 B2 | 1/2004 | Brown et al. |
| 6,684,194 B1 | 1/2004 | Eldering et al. |
| 6,687,608 B2 | 2/2004 | Sugimoto et al. |
| 6,697,792 B2 | 2/2004 | Bunney et al. |
| 6,698,020 B1 | 2/2004 | Zigmond et al. |
| 6,699,127 B1 | 3/2004 | Lobb et al. |
| 6,701,363 B1 | 3/2004 | Chiu et al. |
| 6,704,930 B1 | 3/2004 | Eldering et al. |
| 6,709,335 B2 | 3/2004 | Bates et al. |
| 6,712,702 B2 | 3/2004 | Goldberg et al. |
| 6,714,236 B1 | 3/2004 | Wada et al. |
| 6,714,723 B2 | 3/2004 | Abecassis |
| 6,714,917 B1 | 3/2004 | Eldering et al. |
| 6,716,103 B1 | 4/2004 | Eck et al. |
| 6,718,551 B1 | 4/2004 | Swix et al. |
| 6,721,748 B1 | 4/2004 | Knight et al. |
| 6,731,238 B2 | 5/2004 | Johnson |
| 6,738,078 B1 | 5/2004 | Duncombe |
| 6,745,011 B1 | 6/2004 | Hendrickson et al. |
| 6,757,740 B1 | 6/2004 | Parekh et al. |
| 6,758,746 B1 | 7/2004 | Hunter et al. |
| 6,758,754 B1 | 7/2004 | Lavanchy et al. |
| 6,758,755 B2 | 7/2004 | Kelly et al. |
| 6,764,395 B1 | 7/2004 | Guyett |
| 6,764,403 B2 | 7/2004 | Gavin |
| 6,771,290 B1 | 8/2004 | Hoyle |
| 6,783,460 B2 | 8/2004 | Galyean, III et al. |
| 6,785,902 B1 | 8/2004 | Zigmond et al. |
| 6,814,663 B2 | 11/2004 | Edwards et al. |
| 6,820,277 B1 | 11/2004 | Eldering et al. |
| 6,827,645 B2 | 12/2004 | Morita et al. |
| 6,840,861 B2 | 1/2005 | Jordan et al. |
| 6,863,612 B2 | 3/2005 | Willis |
| 6,874,683 B2 | 4/2005 | Keronen et al. |
| 6,882,978 B2 | 4/2005 | Ebisawa |
| 6,890,256 B2 | 5/2005 | Walker et al. |
| 6,895,170 B1 | 5/2005 | Lambert et al. |
| 6,912,398 B1 | 6/2005 | Domnitz |
| 6,928,414 B1 | 8/2005 | Kim |
| 6,941,574 B1 | 9/2005 | Broadwin et al. |
| 6,942,575 B2 | 9/2005 | Mergler |
| 6,954,728 B1 | 10/2005 | Kusumoto et al. |
| 6,955,605 B2 | 10/2005 | Young et al. |
| 6,964,608 B1 | 11/2005 | Koza |
| 6,967,566 B2 | 11/2005 | Weston et al. |
| 6,968,567 B1 | 11/2005 | Gordon et al. |
| 6,970,834 B2 | 11/2005 | Martin et al. |
| 6,970,915 B1 | 11/2005 | Partovi et al. |
| 6,973,664 B2 | 12/2005 | Fries |
| 6,987,221 B2 | 1/2006 | Platt |
| 6,995,788 B2 | 2/2006 | James |
| 7,028,082 B1 | 4/2006 | Rosenberg et al. |
| 7,072,849 B1 | 7/2006 | Filepp et al. |
| 7,086,187 B2 | 8/2006 | Bandak |
| 7,136,871 B2 | 11/2006 | Ozer et al. |
| 7,305,442 B1 | 12/2007 | Lundy |
| 7,362,999 B2 | 4/2008 | Petschke et al. |
| 7,363,643 B2 | 4/2008 | Drake et al. |
| 7,370,002 B2 | 5/2008 | Heckerman et al. |
| 7,370,073 B2 | 5/2008 | Yen et al. |
| 7,386,127 B2 | 6/2008 | Bar-On |
| 7,401,140 B2 | 7/2008 | Goulden et al. |
| 7,421,454 B2 | 9/2008 | DeShan et al. |
| 7,437,368 B1 | 10/2008 | Kolluri et al. |
| 7,466,823 B2 | 12/2008 | Vestergaard et al. |
| 7,487,112 B2 | 2/2009 | Barnes, Jr. |
| 7,594,189 B1 | 9/2009 | Walker et al. |
| 7,707,485 B2 | 4/2010 | Laksono |
| 8,005,713 B1 | 8/2011 | Sanz-Pastor et al. |
| 8,024,766 B2 | 9/2011 | Addington |
| 8,074,076 B2 | 12/2011 | Courtois |
| 8,175,921 B1 | 5/2012 | Kopra |
| 8,191,088 B2 | 5/2012 | Edwards et al. |
| 8,267,783 B2 | 9/2012 | van Datta |
| 8,272,964 B2 | 9/2012 | van Datta |
| 8,302,030 B2 | 10/2012 | Soroca et al. |
| 8,574,074 B2 | 11/2013 | van Datta |
| 8,626,584 B2 | 1/2014 | van Datta |
| 8,645,992 B2 | 2/2014 | Russell |
| 8,676,900 B2 | 3/2014 | Yruski |
| 2001/0011226 A1 | 8/2001 | Greer et al. |
| 2001/0013009 A1 | 8/2001 | Greening et al. |
| 2001/0014915 A1 | 8/2001 | Blumenau |
| 2001/0025245 A1 | 9/2001 | Flickinger et al. |
| 2001/0025254 A1 | 9/2001 | Park |
| 2001/0025274 A1 | 9/2001 | Zehr et al. |
| 2001/0027412 A1 | 10/2001 | Son |
| 2001/0032125 A1 | 10/2001 | Bhan et al. |
| 2001/0032132 A1 | 10/2001 | Moran |
| 2001/0032133 A1 | 10/2001 | Moran |
| 2001/0032137 A1 | 10/2001 | Bennett et al. |
| 2001/0032333 A1 | 10/2001 | Flickinger |
| 2001/0034643 A1 | 10/2001 | Acres |
| 2001/0034762 A1 | 10/2001 | Jacobs et al. |
| 2001/0037232 A1 | 11/2001 | Miller |
| 2001/0039210 A1 | 11/2001 | St-Denis |
| 2001/0047297 A1 | 11/2001 | Wen |
| 2001/0049620 A1 | 12/2001 | Blasko |
| 2001/0052123 A1 | 12/2001 | Kawai |
| 2002/0004743 A1 | 1/2002 | Kutaragi et al. |
| 2002/0004744 A1 | 1/2002 | Muyres et al. |
| 2002/0007307 A1 | 1/2002 | Miller et al. |
| 2002/0007310 A1 | 1/2002 | Long |
| 2002/0010626 A1 | 1/2002 | Agmoni |
| 2002/0010628 A1 | 1/2002 | Burns |
| 2002/0010757 A1 | 1/2002 | Granik et al. |
| 2002/0013174 A1 | 1/2002 | Murata |
| 2002/0018076 A1 | 2/2002 | Gianola |
| 2002/0018982 A1 | 2/2002 | Conroy |
| 2002/0019774 A1 | 2/2002 | Kanter |
| 2002/0022476 A1 | 2/2002 | Go |
| 2002/0022516 A1 | 2/2002 | Forden |
| 2002/0023000 A1 | 2/2002 | Bollay |
| 2002/0026345 A1 | 2/2002 | Juels |
| 2002/0026355 A1 | 2/2002 | Mitsuoka et al. |
| 2002/0026638 A1 | 2/2002 | Eldering et al. |
| 2002/0032608 A1 | 3/2002 | Kanter |
| 2002/0032626 A1 | 3/2002 | DeWolf et al. |
| 2002/0032906 A1 | 3/2002 | Grossman |
| 2002/0044687 A1 | 4/2002 | Federman |
| 2002/0046087 A1 | 4/2002 | Hey |
| 2002/0046095 A1 | 4/2002 | Wallace |
| 2002/0046102 A1 | 4/2002 | Dohring et al. |
| 2002/0049968 A1 | 4/2002 | Wilson et al. |
| 2002/0051521 A1 | 5/2002 | Patrick |
| 2002/0055833 A1 | 5/2002 | Sterling |
| 2002/0055876 A1 | 5/2002 | Gabler |
| 2002/0056107 A1 | 5/2002 | Schlack |
| 2002/0059577 A1 | 5/2002 | Lu et al. |
| 2002/0059590 A1 | 5/2002 | Kitsukawa et al. |
| 2002/0059610 A1 | 5/2002 | Ellis |
| 2002/0061778 A1 | 5/2002 | Acres |
| 2002/0067730 A1 | 6/2002 | Hinderks et al. |
| 2002/0069240 A1 | 6/2002 | Berk |
| 2002/0069405 A1 | 6/2002 | Chapin et al. |
| 2002/0072965 A1 | 6/2002 | Merriman et al. |
| 2002/0072966 A1 | 6/2002 | Eldering et al. |
| 2002/0073235 A1 | 6/2002 | Chen et al. |
| 2002/0077906 A1 | 6/2002 | Remler |
| 2002/0078441 A1 | 6/2002 | Drake et al. |
| 2002/0078444 A1 | 6/2002 | Krewin et al. |
| 2002/0082077 A1 | 6/2002 | Johnson et al. |
| 2002/0082910 A1 | 6/2002 | Kontogouris |
| 2002/0082913 A1 | 6/2002 | Li |
| 2002/0082941 A1 | 6/2002 | Bird |
| 2002/0083435 A1 | 6/2002 | Blasko et al. |
| 2002/0083439 A1 | 6/2002 | Eldering |
| 2002/0083441 A1 | 6/2002 | Flickinger et al. |
| 2002/0083442 A1 | 6/2002 | Eldering |
| 2002/0083443 A1 | 6/2002 | Eldering et al. |
| 2002/0083444 A1 | 6/2002 | Blasko et al. |
| 2002/0083445 A1 | 6/2002 | Flickinger et al. |

(56) References Cited

U.S. PATENT DOCUMENTS

| | | |
|---|---|---|
| 2002/0083451 A1 | 6/2002 | Gill et al. |
| 2002/0087402 A1 | 7/2002 | Zustak |
| 2002/0087403 A1 | 7/2002 | Meyers et al. |
| 2002/0087887 A1 | 7/2002 | Busam et al. |
| 2002/0087973 A1 | 7/2002 | Hamilton et al. |
| 2002/0087975 A1 | 7/2002 | Schlack |
| 2002/0087980 A1 | 7/2002 | Eldering et al. |
| 2002/0094868 A1 | 7/2002 | Tuck et al. |
| 2002/0095676 A1 | 7/2002 | Knee et al. |
| 2002/0098891 A1 | 7/2002 | Graham et al. |
| 2002/0099600 A1 | 7/2002 | Merriman et al. |
| 2002/0099611 A1 | 7/2002 | De Souza et al. |
| 2002/0099653 A1 | 7/2002 | De Souza et al. |
| 2002/0100040 A1 | 7/2002 | Bull |
| 2002/0107073 A1 | 8/2002 | Binney |
| 2002/0107075 A1 | 8/2002 | Stephan |
| 2002/0107730 A1 | 8/2002 | Bernstein |
| 2002/0109680 A1 | 8/2002 | Orbanes et al. |
| 2002/0111154 A1 | 8/2002 | Eldering et al. |
| 2002/0111172 A1 | 8/2002 | De Wolf et al. |
| 2002/0111825 A1 | 8/2002 | Martin et al. |
| 2002/0111865 A1 | 8/2002 | Middleton, III et al. |
| 2002/0112035 A1 | 8/2002 | Carey et al. |
| 2002/0112233 A1 | 8/2002 | Cantu Bonilla et al. |
| 2002/0112240 A1 | 8/2002 | Bacso et al. |
| 2002/0112249 A1 | 8/2002 | Hendricks et al. |
| 2002/0112250 A1 | 8/2002 | Koplar et al. |
| 2002/0114466 A1 | 8/2002 | Tanaka et al. |
| 2002/0116284 A1 | 8/2002 | Steelman et al. |
| 2002/0120589 A1 | 8/2002 | Aoki |
| 2002/0122052 A1 | 9/2002 | Reich et al. |
| 2002/0123928 A1 | 9/2002 | Eldering et al. |
| 2002/0129368 A1 | 9/2002 | Schlack et al. |
| 2002/0133398 A1 | 9/2002 | Geller et al. |
| 2002/0136407 A1 | 9/2002 | Denning et al. |
| 2002/0138493 A1 | 9/2002 | Shapiro et al. |
| 2002/0143639 A1 | 10/2002 | Beckett et al. |
| 2002/0143652 A1 | 10/2002 | Beckett |
| 2002/0143782 A1 | 10/2002 | Headings et al. |
| 2002/0143901 A1 | 10/2002 | Lupo et al. |
| 2002/0144262 A1 | 10/2002 | Plotnick et al. |
| 2002/0144263 A1 | 10/2002 | Eldering et al. |
| 2002/0147633 A1 | 10/2002 | Rafizadeh |
| 2002/0147638 A1 | 10/2002 | Banerjee et al. |
| 2002/0147645 A1 | 10/2002 | Alao et al. |
| 2002/0152117 A1 | 10/2002 | Cristofalo et al. |
| 2002/0155878 A1 | 10/2002 | Lert, Jr. et al. |
| 2002/0155891 A1 | 10/2002 | Okada et al. |
| 2002/0157002 A1 | 10/2002 | Messerges et al. |
| 2002/0161625 A1 | 10/2002 | Brito-Valladares et al. |
| 2002/0161639 A1 | 10/2002 | Goldstein |
| 2002/0164977 A1 | 11/2002 | Link, II et al. |
| 2002/0164999 A1 | 11/2002 | Johnson |
| 2002/0165026 A1 | 11/2002 | Perkins et al. |
| 2002/0165764 A1 | 11/2002 | Wade et al. |
| 2002/0173349 A1 | 11/2002 | Ach, III |
| 2002/0173359 A1 | 11/2002 | Gallo et al. |
| 2002/0175936 A1 | 11/2002 | Tenembaum |
| 2002/0178442 A1 | 11/2002 | Williams |
| 2002/0178445 A1 | 11/2002 | Eldering et al. |
| 2002/0178447 A1 | 11/2002 | Plotnick et al. |
| 2002/0184047 A1 | 12/2002 | Plotnick et al. |
| 2002/0184086 A1 | 12/2002 | Linde |
| 2002/0184088 A1 | 12/2002 | Rosenberg |
| 2002/0184130 A1 | 12/2002 | Blasko |
| 2002/0184642 A1 | 12/2002 | Lude et al. |
| 2002/0193066 A1 | 12/2002 | Connelly |
| 2002/0194058 A1 | 12/2002 | Eldering |
| 2002/0194585 A1 | 12/2002 | Connelly |
| 2002/0194590 A1 | 12/2002 | Pong |
| 2002/0194598 A1 | 12/2002 | Connelly |
| 2002/0194607 A1 | 12/2002 | Connelly |
| 2003/0004810 A1 | 1/2003 | Eldering |
| 2003/0009762 A1 | 1/2003 | Hooper et al. |
| 2003/0014307 A1 | 1/2003 | Heng |
| 2003/0014312 A1 | 1/2003 | Fleisher |
| 2003/0014414 A1 | 1/2003 | Newman |
| 2003/0014754 A1 | 1/2003 | Chang |
| 2003/0018527 A1 | 1/2003 | Filepp et al. |
| 2003/0018797 A1 | 1/2003 | Dunning et al. |
| 2003/0028433 A1 | 2/2003 | Merriman et al. |
| 2003/0033405 A1 | 2/2003 | Perdon et al. |
| 2003/0035075 A1 | 2/2003 | Butler et al. |
| 2003/0036944 A1 | 2/2003 | Lesandrini et al. |
| 2003/0046148 A1 | 3/2003 | Rizzi et al. |
| 2003/0048293 A1 | 3/2003 | Werkhoven |
| 2003/0054888 A1 | 3/2003 | Walker et al. |
| 2003/0060247 A1 | 3/2003 | Goldberg et al. |
| 2003/0066092 A1 | 4/2003 | Wagner et al. |
| 2003/0070167 A1 | 4/2003 | Holtz et al. |
| 2003/0073496 A1 | 4/2003 | D'Amico et al. |
| 2003/0074252 A1 | 4/2003 | Chandler-Pepelnjak et al. |
| 2003/0076347 A1 | 4/2003 | Barrett et al. |
| 2003/0079226 A1 | 4/2003 | Barrett |
| 2003/0084449 A1 | 5/2003 | Chane et al. |
| 2003/0084456 A1 | 5/2003 | Ryan et al. |
| 2003/0093311 A1 | 5/2003 | Knowlson |
| 2003/0100375 A1 | 5/2003 | Wakae et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0103644 A1 | 6/2003 | Klayh |
| 2003/0104867 A1 | 6/2003 | Kobayashi et al. |
| 2003/0110131 A1 | 6/2003 | Alain et al. |
| 2003/0110171 A1 | 6/2003 | Ozer et al. |
| 2003/0110499 A1 | 6/2003 | Knudson et al. |
| 2003/0115074 A1 | 6/2003 | Freeman et al. |
| 2003/0115318 A1 | 6/2003 | Wueste |
| 2003/0115587 A1 | 6/2003 | Kendall et al. |
| 2003/0126150 A1 | 7/2003 | Chan |
| 2003/0135513 A1 | 7/2003 | Quinn et al. |
| 2003/0139966 A1 | 7/2003 | Sirota et al. |
| 2003/0144044 A1 | 7/2003 | Pisarsky |
| 2003/0144048 A1 | 7/2003 | Silva |
| 2003/0148625 A1 | 8/2003 | Ho et al. |
| 2003/0149618 A1 | 8/2003 | Sender et al. |
| 2003/0149623 A1 | 8/2003 | Chen |
| 2003/0149938 A1 | 8/2003 | McElfresh et al. |
| 2003/0149975 A1 | 8/2003 | Eldering et al. |
| 2003/0158872 A1 | 8/2003 | Adams |
| 2003/0163369 A1 | 8/2003 | Arr |
| 2003/0163482 A1 | 8/2003 | Bunney et al. |
| 2003/0171988 A1 | 9/2003 | Sugihara |
| 2003/0171990 A1 | 9/2003 | Rao et al. |
| 2003/0172376 A1 | 9/2003 | Coffin, III |
| 2003/0177490 A1 | 9/2003 | Hoshino et al. |
| 2003/0182567 A1 | 9/2003 | Barton et al. |
| 2003/0182663 A1 | 9/2003 | Gudorf et al. |
| 2003/0187719 A1 | 10/2003 | Brocklebank |
| 2003/0190961 A1 | 10/2003 | Seidman |
| 2003/0191690 A1 | 10/2003 | McIntyre et al. |
| 2003/0191742 A1 | 10/2003 | Yonezawa et al. |
| 2003/0195021 A1 | 10/2003 | Yamashita et al. |
| 2003/0195801 A1 | 10/2003 | Takakura et al. |
| 2003/0195837 A1 | 10/2003 | Kostic et al. |
| 2003/0199292 A1 | 10/2003 | Greenberg |
| 2003/0200452 A1 | 10/2003 | Tagawa et al. |
| 2003/0204632 A1 | 10/2003 | Willebeek-LeMair et al. |
| 2003/0212608 A1 | 11/2003 | Cliff |
| 2003/0215211 A1 | 11/2003 | Coffin, III |
| 2003/0216961 A1 | 11/2003 | Barry |
| 2003/0226141 A1 | 12/2003 | Krasnow et al. |
| 2003/0226142 A1 | 12/2003 | Rand |
| 2003/0229893 A1 | 12/2003 | Sgaraglino |
| 2004/0002380 A1 | 1/2004 | Brosnan et al. |
| 2004/0003396 A1 | 1/2004 | Babu |
| 2004/0014454 A1 | 1/2004 | Burgess et al. |
| 2004/0015397 A1 | 1/2004 | Barry et al. |
| 2004/0015608 A1 | 1/2004 | Ellis et al. |
| 2004/0019521 A1 | 1/2004 | Birmingham |
| 2004/0025174 A1 | 2/2004 | Cerrato |
| 2004/0030595 A1 | 2/2004 | Park |
| 2004/0034536 A1 | 2/2004 | Hughes |
| 2004/0034686 A1 | 2/2004 | Guthrie |

(56) References Cited

U.S. PATENT DOCUMENTS

| | | |
|---|---|---|
| 2004/0039648 A1 | 2/2004 | Candelore et al. |
| 2004/0039796 A1 | 2/2004 | Watkins |
| 2004/0043817 A1 | 3/2004 | Willis |
| 2004/0043819 A1 | 3/2004 | Willis |
| 2004/0044567 A1 | 3/2004 | Willis |
| 2004/0044569 A1 | 3/2004 | Roberts et al. |
| 2004/0044571 A1 | 3/2004 | Bronnimann et al. |
| 2004/0044574 A1 | 3/2004 | Cochran et al. |
| 2004/0054589 A1 | 3/2004 | Nicholas et al. |
| 2004/0057348 A1 | 3/2004 | Shteyn et al. |
| 2004/0059625 A1 | 3/2004 | Schrader |
| 2004/0068552 A1 | 4/2004 | Kotz et al. |
| 2004/0073482 A1 | 4/2004 | Wiggins et al. |
| 2004/0078263 A1 | 4/2004 | Altieri |
| 2004/0078266 A1 | 4/2004 | Kim |
| 2004/0078292 A1 | 4/2004 | Blumenau |
| 2004/0078809 A1 | 4/2004 | Drazin |
| 2004/0083133 A1 | 4/2004 | Nicholas et al. |
| 2004/0088583 A1 | 5/2004 | Yoon et al. |
| 2004/0102248 A1 | 5/2004 | Young et al. |
| 2004/0103024 A1 | 5/2004 | Patel et al. |
| 2004/0103429 A1 | 5/2004 | Carlucci et al. |
| 2004/0107136 A1 | 6/2004 | Nemirofsky et al. |
| 2004/0110565 A1 | 6/2004 | Levesque |
| 2004/0111317 A1 | 6/2004 | Ebisawa |
| 2004/0111484 A1 | 6/2004 | Young et al. |
| 2004/0116183 A1 | 6/2004 | Prindle |
| 2004/0117272 A1 | 6/2004 | Shehab |
| 2004/0121835 A1 | 6/2004 | Willis et al. |
| 2004/0121842 A1 | 6/2004 | Willis et al. |
| 2004/0126747 A1 | 7/2004 | Fujisawa et al. |
| 2004/0133480 A1 | 7/2004 | Domes |
| 2004/0133518 A1 | 7/2004 | Dryall |
| 2004/0137980 A1 | 7/2004 | Aenlle |
| 2004/0139465 A1 | 7/2004 | Matthews, III et al. |
| 2004/0140352 A1 | 7/2004 | Walker et al. |
| 2004/0143478 A1 | 7/2004 | Ward |
| 2004/0143495 A1 | 7/2004 | Koenig |
| 2004/0148221 A1 | 7/2004 | Chu |
| 2004/0148424 A1 | 7/2004 | Berkson et al. |
| 2004/0148625 A1 | 7/2004 | Eldering et al. |
| 2004/0152517 A1 | 8/2004 | Hardisty et al. |
| 2004/0152518 A1 | 8/2004 | Kogo |
| 2004/0153360 A1 | 8/2004 | Schumann |
| 2004/0153363 A1 | 8/2004 | Stehling |
| 2004/0153385 A1 | 8/2004 | Allibhoy et al. |
| 2004/0153453 A1 | 8/2004 | Brodie et al. |
| 2004/0158858 A1 | 8/2004 | Paxton |
| 2004/0162758 A1 | 8/2004 | Willis |
| 2004/0162759 A1 | 8/2004 | Willis |
| 2004/0163101 A1 | 8/2004 | Swix et al. |
| 2004/0163134 A1 | 8/2004 | Willis |
| 2004/0168063 A1 | 8/2004 | Revital et al. |
| 2004/0168188 A1 | 8/2004 | Bennington et al. |
| 2004/0168202 A1 | 8/2004 | Ebihara |
| 2004/0169678 A1 | 9/2004 | Oliver |
| 2004/0172324 A1 | 9/2004 | Merriman et al. |
| 2004/0172331 A1 | 9/2004 | Merriman et al. |
| 2004/0172332 A1 | 9/2004 | Merriman et al. |
| 2004/0172343 A1 | 9/2004 | Allibhoy et al. |
| 2004/0176170 A1 | 9/2004 | Eck et al. |
| 2004/0176995 A1 | 9/2004 | Fusz |
| 2004/0177001 A1 | 9/2004 | Salinas |
| 2004/0181808 A1 | 9/2004 | Schaefer et al. |
| 2004/0186766 A1 | 9/2004 | Fellenstein et al. |
| 2004/0186771 A1 | 9/2004 | Squires |
| 2004/0193488 A1 | 9/2004 | Khoo |
| 2004/0194123 A1 | 9/2004 | Fredlund et al. |
| 2004/0194128 A1 | 9/2004 | McIntyre et al. |
| 2004/0201629 A1 | 10/2004 | Bates et al. |
| 2004/0204238 A1 | 10/2004 | Aoki |
| 2004/0204247 A1 | 10/2004 | Walker et al. |
| 2004/0205157 A1 | 10/2004 | Bibelnieks et al. |
| 2004/0205508 A1 | 10/2004 | Wecker et al. |
| 2004/0205807 A1 | 10/2004 | Wilcoxson et al. |
| 2004/0210472 A1 | 10/2004 | Lew et al. |
| 2004/0210489 A1 | 10/2004 | Jackson et al. |
| 2004/0210661 A1 | 10/2004 | Thompson |
| 2004/0210824 A1 | 10/2004 | Shoff et al. |
| 2004/0219977 A1 | 11/2004 | Ebisawa |
| 2004/0220850 A1 | 11/2004 | Ferrer et al. |
| 2004/0221018 A1 | 11/2004 | Ji |
| 2004/0224772 A1 | 11/2004 | Canessa et al. |
| 2004/0225562 A1 | 11/2004 | Turner |
| 2004/0225715 A1 | 11/2004 | Gottfried |
| 2004/0230593 A1 | 11/2004 | Rudin et al. |
| 2004/0230994 A1 | 11/2004 | Urdang et al. |
| 2004/0234932 A1 | 11/2004 | Hughes et al. |
| 2004/0236585 A1 | 11/2004 | Kohnke et al. |
| 2004/0243455 A1 | 12/2004 | Smith |
| 2004/0243466 A1 | 12/2004 | Trzybinski et al. |
| 2004/0243470 A1 | 12/2004 | Ozer et al. |
| 2004/0243623 A1 | 12/2004 | Ozer et al. |
| 2004/0248649 A1 | 12/2004 | Arai et al. |
| 2004/0249786 A1 | 12/2004 | Dabney et al. |
| 2004/0252051 A1 | 12/2004 | Johnson |
| 2004/0254831 A1 | 12/2004 | Dean |
| 2004/0254957 A1 | 12/2004 | Hyotyniemi et al. |
| 2004/0255148 A1 | 12/2004 | Monteiro et al. |
| 2004/0259553 A1 | 12/2004 | Delaney et al. |
| 2004/0260609 A1 | 12/2004 | Loeb et al. |
| 2004/0261125 A1 | 12/2004 | Ellis et al. |
| 2004/0266535 A1 | 12/2004 | Reeves |
| 2004/0266537 A1 | 12/2004 | Morris |
| 2004/0267611 A1 | 12/2004 | Hoerenz |
| 2005/0005242 A1 | 1/2005 | Hoyle |
| 2005/0015267 A1 | 1/2005 | Barringer et al. |
| 2005/0021387 A1 | 1/2005 | Gottfurcht |
| 2005/0021396 A1 | 1/2005 | Pearch et al. |
| 2005/0021397 A1 | 1/2005 | Cui et al. |
| 2005/0021403 A1 | 1/2005 | Ozer et al. |
| 2005/0021465 A1 | 1/2005 | Segerstrom |
| 2005/0021470 A1 | 1/2005 | Martin et al. |
| 2005/0021853 A1 | 1/2005 | Parekh et al. |
| 2005/0027587 A1 | 2/2005 | Latona et al. |
| 2005/0027595 A1 | 2/2005 | Ha et al. |
| 2005/0027699 A1 | 2/2005 | Awadallah et al. |
| 2005/0028188 A1 | 2/2005 | Latona et al. |
| 2005/0028195 A1 | 2/2005 | Feinleib et al. |
| 2005/0032577 A1 | 2/2005 | Blackburn et al. |
| 2005/0033700 A1 | 2/2005 | Vogler et al. |
| 2005/0038698 A1 | 2/2005 | Lukose et al. |
| 2005/0038702 A1 | 2/2005 | Merriman et al. |
| 2005/0050070 A1 | 3/2005 | Sheldon |
| 2005/0055725 A1 | 3/2005 | Stewart |
| 2005/0060264 A1 | 3/2005 | Schrock et al. |
| 2005/0060742 A1* | 3/2005 | Riedl et al. .............. 725/34 |
| 2005/0075155 A1 | 4/2005 | Sitrick |
| 2005/0075172 A1 | 4/2005 | Coleman |
| 2005/0076051 A1 | 4/2005 | Carobus et al. |
| 2005/0091107 A1 | 4/2005 | Blum |
| 2005/0091108 A1 | 4/2005 | Frost |
| 2005/0091111 A1 | 4/2005 | Green et al. |
| 2005/0096975 A1 | 5/2005 | Moshe |
| 2005/0096983 A1 | 5/2005 | Werkhoven |
| 2005/0097622 A1 | 5/2005 | Zigmond et al. |
| 2005/0101386 A1 | 5/2005 | Lavanchy et al. |
| 2005/0102177 A1 | 5/2005 | Takayama |
| 2005/0102202 A1 | 5/2005 | Linden et al. |
| 2005/0107158 A1 | 5/2005 | Kanisawa et al. |
| 2005/0108095 A1 | 5/2005 | Perlmutter |
| 2005/0113170 A1 | 5/2005 | McHugh |
| 2005/0114526 A1 | 5/2005 | Aoyama |
| 2005/0125286 A1 | 6/2005 | Crippen et al. |
| 2005/0125528 A1 | 6/2005 | Burke et al. |
| 2005/0130725 A1 | 6/2005 | Creamer et al. |
| 2005/0143174 A1 | 6/2005 | Goldman et al. |
| 2005/0144063 A1 | 6/2005 | Spector |
| 2005/0144073 A1 | 6/2005 | Morrisroe et al. |
| 2005/0149396 A1 | 7/2005 | Horowitz et al. |
| 2005/0153760 A1 | 7/2005 | Varley |
| 2005/0154640 A1 | 7/2005 | Kolluri et al. |
| 2005/0154717 A1 | 7/2005 | Watson et al. |
| 2005/0155056 A1 | 7/2005 | Knee et al. |

(56) References Cited

U.S. PATENT DOCUMENTS

| | | |
|---|---|---|
| 2005/0155083 A1 | 7/2005 | Oh et al. |
| 2005/0160442 A1 | 7/2005 | Kaplowitz |
| 2005/0164757 A1 | 7/2005 | Ebisawa |
| 2005/0165640 A1 | 7/2005 | Kotorov |
| 2005/0165644 A1 | 7/2005 | Beyda et al. |
| 2005/0171865 A1 | 8/2005 | Beardow |
| 2005/0177413 A1 | 8/2005 | Blumberg et al. |
| 2005/0177430 A1 | 8/2005 | Willis |
| 2005/0177431 A1 | 8/2005 | Willis et al. |
| 2005/0177461 A1 | 8/2005 | Rosefelt et al. |
| 2005/0178940 A1 | 8/2005 | Granick |
| 2005/0179685 A1 | 8/2005 | Kake et al. |
| 2005/0182693 A1 | 8/2005 | Alivandi |
| 2005/0182737 A1 | 8/2005 | Brown |
| 2005/0185825 A1 | 8/2005 | Hoshino et al. |
| 2005/0192071 A1 | 9/2005 | Matsuno et al. |
| 2005/0192864 A1 | 9/2005 | Ganz |
| 2005/0193411 A1 | 9/2005 | Funston |
| 2005/0193425 A1 | 9/2005 | Sull et al. |
| 2005/0195157 A1 | 9/2005 | Kramer et al. |
| 2005/0202385 A1 | 9/2005 | Coward et al. |
| 2005/0203804 A1 | 9/2005 | Suzuki et al. |
| 2005/0203811 A1 | 9/2005 | David |
| 2005/0204381 A1 | 9/2005 | Ludvig et al. |
| 2005/0216346 A1 | 9/2005 | Kusumoto et al. |
| 2005/0216348 A1 | 9/2005 | Martin et al. |
| 2005/0216581 A1 | 9/2005 | Blumenau et al. |
| 2005/0222908 A1 | 10/2005 | Altberg et al. |
| 2005/0227749 A1 | 10/2005 | Bender et al. |
| 2005/0228797 A1 | 10/2005 | Koningstein et al. |
| 2005/0235030 A1 | 10/2005 | Lauckhart et al. |
| 2005/0235199 A1 | 10/2005 | Adams |
| 2005/0235310 A1 | 10/2005 | Bies |
| 2005/0235318 A1 | 10/2005 | Grauch et al. |
| 2005/0240476 A1 | 10/2005 | Bigott |
| 2005/0246736 A1 | 11/2005 | Beyda et al. |
| 2005/0247769 A1 | 11/2005 | Potter et al. |
| 2005/0251539 A1 | 11/2005 | Parekh et al. |
| 2005/0254366 A1 | 11/2005 | Amar |
| 2005/0256768 A1 | 11/2005 | Robinson |
| 2005/0261062 A1 | 11/2005 | Lewin et al. |
| 2005/0261962 A1 | 11/2005 | Chuah |
| 2005/0266906 A1 | 12/2005 | Stevens |
| 2005/0266907 A1 | 12/2005 | Weston et al. |
| 2005/0270537 A1 | 12/2005 | Mian et al. |
| 2005/0283395 A1 | 12/2005 | Lesandrini et al. |
| 2005/0283401 A1 | 12/2005 | Swix et al. |
| 2005/0288999 A1 | 12/2005 | Lerner et al. |
| 2006/0007312 A1 | 1/2006 | James |
| 2006/0031551 A1 | 2/2006 | Agresta et al. |
| 2006/0085517 A1 | 4/2006 | Kaurila |
| 2006/0085816 A1 | 4/2006 | Funk et al. |
| 2006/0090186 A1 | 4/2006 | Santangelo et al. |
| 2006/0130095 A1 | 6/2006 | Willis et al. |
| 2006/0143650 A1 | 6/2006 | Tanikawa et al. |
| 2006/0150249 A1 | 7/2006 | Gassen et al. |
| 2006/0167747 A1 | 7/2006 | Goodman |
| 2006/0193471 A1 | 8/2006 | Stehle |
| 2006/0195859 A1 | 8/2006 | Konig et al. |
| 2006/0195860 A1 | 8/2006 | Eldering et al. |
| 2006/0195902 A1* | 8/2006 | King et al. .................. 726/21 |
| 2006/0212347 A1 | 9/2006 | Fang et al. |
| 2006/0212350 A1 | 9/2006 | Ellis et al. |
| 2006/0230141 A1 | 10/2006 | Willis |
| 2006/0242667 A1 | 10/2006 | Peterson et al. |
| 2006/0242703 A1 | 10/2006 | Abeni |
| 2006/0248209 A1 | 11/2006 | Chiu |
| 2006/0253323 A1 | 11/2006 | Phan et al. |
| 2006/0253330 A1 | 11/2006 | Maggio et al. |
| 2006/0265503 A1 | 11/2006 | Jones et al. |
| 2006/0268667 A1 | 11/2006 | Jellison, Jr. et al. |
| 2006/0294566 A1 | 12/2006 | Zlattner |
| 2007/0027771 A1 | 2/2007 | Collins et al. |
| 2007/0038508 A1 | 2/2007 | Jain et al. |
| 2007/0038516 A1 | 2/2007 | Apple et al. |
| 2007/0038931 A1 | 2/2007 | Allaire et al. |
| 2007/0050254 A1 | 3/2007 | Driscoll |
| 2007/0055980 A1 | 3/2007 | Megeid et al. |
| 2007/0061204 A1 | 3/2007 | Ellis et al. |
| 2007/0061838 A1 | 3/2007 | Grubbs et al. |
| 2007/0066287 A1* | 3/2007 | Papulov .................. 455/414.1 |
| 2007/0073756 A1 | 3/2007 | Manhas et al. |
| 2007/0078706 A1 | 4/2007 | van Datta |
| 2007/0078712 A1 | 4/2007 | Ott et al. |
| 2007/0078714 A1 | 4/2007 | Ott |
| 2007/0078989 A1 | 4/2007 | van Datta |
| 2007/0079326 A1 | 4/2007 | van Datta |
| 2007/0079331 A1 | 4/2007 | van Datta |
| 2007/0079335 A1 | 4/2007 | McDonough |
| 2007/0083611 A1 | 4/2007 | Farago et al. |
| 2007/0089151 A1 | 4/2007 | Moore et al. |
| 2007/0094081 A1 | 4/2007 | Yruski |
| 2007/0094082 A1 | 4/2007 | Yruski |
| 2007/0094083 A1 | 4/2007 | Yruski |
| 2007/0094363 A1 | 4/2007 | Yruski |
| 2007/0101360 A1 | 5/2007 | Gutta et al. |
| 2007/0118425 A1 | 5/2007 | Yruski |
| 2007/0130012 A1 | 6/2007 | Yruski |
| 2007/0130594 A1 | 6/2007 | Hidary et al. |
| 2007/0146812 A1 | 6/2007 | Lawton |
| 2007/0150919 A1 | 6/2007 | Morishita |
| 2007/0162945 A1 | 7/2007 | Mills |
| 2007/0168288 A1 | 7/2007 | Bozeman |
| 2007/0174471 A1 | 7/2007 | Van Rossum |
| 2007/0244760 A1 | 10/2007 | Bodnar et al. |
| 2007/0255617 A1* | 11/2007 | Maurone et al. .................. 705/14 |
| 2007/0294740 A1 | 12/2007 | Drake et al. |
| 2007/0299935 A1* | 12/2007 | Plastina et al. .................. 709/219 |
| 2008/0046948 A1* | 2/2008 | Verosub .................. 725/117 |
| 2008/0097872 A1 | 4/2008 | Peckover |
| 2008/0104106 A1 | 5/2008 | Rosenberg et al. |
| 2008/0109844 A1 | 5/2008 | Baldeschwieler et al. |
| 2008/0127244 A1 | 5/2008 | Zhang |
| 2008/0140239 A1 | 6/2008 | Rosenberg et al. |
| 2008/0140717 A1 | 6/2008 | Rosenberg et al. |
| 2008/0141372 A1 | 6/2008 | Massey et al. |
| 2008/0207137 A1* | 8/2008 | Maharajh et al. .................. 455/74 |
| 2009/0083788 A1 | 3/2009 | Russell |
| 2009/0183081 A1 | 7/2009 | Rodriguez |
| 2010/0022310 A1 | 1/2010 | van Datta |
| 2010/0030640 A1 | 2/2010 | van Datta |
| 2010/0043022 A1 | 2/2010 | Kaftan |
| 2010/0169910 A1 | 7/2010 | Collins et al. |
| 2010/0269138 A1 | 10/2010 | Krikorian et al. |
| 2011/0004669 A1 | 1/2011 | Navar |
| 2011/0010545 A1 | 1/2011 | Kill et al. |
| 2011/0015975 A1 | 1/2011 | Yruski et al. |
| 2011/0029383 A1 | 2/2011 | Engel et al. |
| 2011/0125582 A1 | 5/2011 | van Datta |
| 2011/0307339 A1 | 12/2011 | Russell |
| 2013/0232000 A1 | 9/2013 | van Datta |
| 2013/0232001 A1 | 9/2013 | van Datta |
| 2013/0297411 A1 | 11/2013 | van Datta |
| 2014/0019229 A1 | 1/2014 | van Datta |
| 2014/0089081 A1 | 3/2014 | Yruski |

FOREIGN PATENT DOCUMENTS

| | | |
|---|---|---|
| EP | 0 337 539 | 10/1989 |
| EP | 0 405 776 | 1/1991 |
| EP | 0 620 688 | 10/1994 |
| EP | 0 625 760 | 11/1994 |
| EP | 0 743 595 | 10/1996 |
| EP | 0 905 928 | 3/1999 |
| GB | 2 141 907 | 1/1985 |
| GB | 2 194 369 | 3/1988 |
| JP | 12-20925 | 9/1989 |
| JP | 63-35569 | 12/1994 |
| JP | 81-17445 | 5/1996 |
| JP | 81-73634 | 7/1996 |
| JP | 82-80934 | 10/1996 |
| JP | 2001111921 | 4/2001 |
| JP | 2001-321556 | 11/2001 |
| JP | 2002-259433 | 9/2002 |

(56) References Cited

FOREIGN PATENT DOCUMENTS

| JP | 2002-358455 | 12/2002 |
|---|---|---|
| JP | 2002-366971 | 12/2002 |
| JP | 2003-248844 | 9/2003 |
| JP | 2004-298469 | 10/2004 |
| WO | WO 93/14462 | 7/1993 |
| WO | WO 03/032127 | 9/1993 |
| WO | WO 93/22017 | 11/1993 |
| WO | WO 93/23125 | 11/1993 |
| WO | WO 95/12442 | 5/1995 |
| WO | WO 95/12853 | 5/1995 |
| WO | WO 98/51384 | 11/1998 |
| WO | WO 93/19427 | 4/2003 |
| WO | WO 2004/100010 | 11/2004 |
| WO | WO 2005/086969 | 9/2005 |
| WO | WO 2007/041022 | 4/2007 |
| WO | WO 2007/041028 | 4/2007 |
| WO | WO 2007/130681 | 11/2007 |

OTHER PUBLICATIONS

Extended European Search Report for EP 07776856.2 dated Jun. 9, 2011.
JP Notification Reasons for Refusal for JP Application No. 2009-509786 dated Jul. 28, 2011.
U.S. Appl. No. 12/190,323 Final Office Action mailed Nov. 14, 2011.
U.S. Appl. No. 12/571,225 Office Action mailed Feb. 2, 2012.
U.S. Appl. No. 11/586,959 Office Action mailed Feb. 12, 2014.
Andreaux. J.-P.; Copy Protection system for digital home networks; Mar. 2004; IEEE, vol. 21, Issue: 2; pp. 100-108.
Business Wire, "Juno launches America's first free Internet e-mail service; Initial advertisers include Land's End, Miramax and Snapple," Apr. 19, 1996.
Business Wire, "RTIME Announces First 100-Person Twitch Game for Internet; "RTIME Rocks!" Demonstrates the Power of the RTIME Interactive Networking Engine to Support Large Scale, High Performance, Internet Game Play," Apr. 14, 1997.
Cohen, Josh, "A General Overview of Two New Technologies for Playing Protected Content on Portable or Networked Devices," Microsoft Windows Media, Jun. 2004, 1-8.
Courtois N et al: An Algebraic Masking Method to Protect AES Agaist Power Attacks, 'Online! XP002344150 Retrieved from the Internet: URL:eprint.iacr.org/2005/204.pdf> 'retrieved on Sep. 8, 2005!
Microsoft Corporation, "A Technical Overview of Windows Media DRM 10 for Devices," Microsoft Windows Media, Sep. 2004, 1-16.
Microsoft Corporation, "Architecture of Windows Media Rights Manager," www.microsoft.com/windows/windowsmedia/howto/articles/drmarchitecture.aspc, May 2004.
PricewaterhouseCoopers, "Lab Online Ad Measurement Study," Dec. 2001.
Recording Industry Association of America, "Frequently Asked Questions—Webcasting," www.riaa.com/issues/licensing/webcasting_faq.asp. (acc. 2004).
U.S. Copyright Office, "The Digital Millennium Copyright Act of 1998," Oct. 1998, 1-18.
What TV Ratings Really Mean (and Other Frequently-Asked Questions). Nielsen Media Research. Web. <http:!/ documents. chelmsford. k 12. ma.us/dsweb/GeUDocument-14983/ nielsenmedia.htm>, Jun. 2005.
PCT/US06/037018, International Search Report and Written Opinion mailed Aug. 7, 2007.
PCT/US06/036958, International Search Report and Written Opinion mailed Apr. 27, 2007.
PCT/US07/11059, International Search Report and Written Opinion mailed May 30, 2008.
EP 06815173.7, Extended European Search Report mailed Oct. 5, 2011.
JP 2009-509786, Decision of Refusal mailed Oct. 30, 2012.
JP 2009-509786, Decision of Refusal mailed Jul. 28, 2011.
CN 200780016268.2, First Office Action mailed Jan. 4, 2012.
U.S. Appl. No. 11/241,229 Final Office Action mailed Apr. 23, 2010.
U.S. Appl. No. 11/241,229 Office Action mailed Nov. 19, 2009.
U.S. Appl. No. 12/571,204 Office Action mailed Feb. 28, 2012.
U.S. Appl. No. 11/240,655 Office Action mailed Aug. 5, 2013.
U.S. Appl. No. 11/240,655 Final Office Action mailed Jan. 27, 2010.
U.S. Appl. No. 11/240,655 Office Action mailed Apr. 16, 2009.
U.S. Appl. No. 12/190,323 Final Office Action mailed Feb. 25, 2013.
U.S. Appl. No. 12/190,323 Office Action mailed May 7, 2012.
U.S. Appl. No. 12/190,323 Office Action mailed Jun. 8, 2011.
U.S. Appl. No. 13/191,398 Final Office Action mailed Jun. 7, 2013.
U.S. Appl. No. 13/191,398 Office Action mailed Mar. 22, 2012.
U.S. Appl. No. 11/535,370 Final Office Action mailed Jun. 8, 2010.
U.S. Appl. No. 11/535,307 Office Action mailed Dec. 12, 2009.
U.S. Appl. No. 11/535,307 Final Action mailed Sep. 8, 2009.
U.S. Appl. No. 11/535,307 Office Action mailed Apr. 16, 2009.
U.S. Appl. No. 13/013,789 Final Office Action mailed Feb. 27, 2013.
U.S. Appl. No. 13/013,789 Office Action mailed Oct. 9, 2012.
U.S. Appl. No. 11/452,848 Final Office Action mailed Feb. 15, 2011.
U.S. Appl. No. 11/452,848 Office Action mailed Sep. 15, 2010.
U.S. Appl. No. 11/452,848 Final Office Action mailed Apr. 21, 2010.
U.S. Appl. No. 11/452,848 Office Action mailed Oct. 20, 2009.
U.S. Appl. No. 11/452,848 Final Office Action mailed Jul. 9, 2009.
U.S. Appl. No. 11/452,848 Office Action mailed Jan. 27, 2009.
U.S. Appl. No. 11/586,990 Final Office Action mailed Apr. 10, 2013.
U.S. Appl. No. 11/586,990 Office Action mailed Nov. 23, 2012.
U.S. Appl. No. 11/586,990 Final Office Action mailed Feb. 14, 2011.
U.S. Appl. No. 11/586,990 Office Action mailed Sep. 15, 2010.
U.S. Appl. No. 11/588,036 Final Office Action mailed Oct. 4, 2012.
U.S. Appl. No. 11/588,036 Office Action mailed Apr. 27, 2012.
U.S. Appl. No. 11/588,036 Final Office Action mailed Feb. 17, 2011.
U.S. Appl. No. 11/588,036 Office Action mailed Sep. 14, 2010.
U.S. Appl. No. 11/586,958 Office Action mailed Mar. 18, 2011.
U.S. Appl. No. 11/586,958 Office Action mailed Sep. 1, 2010.
U.S. Appl. No. 11/586,958 Office Action mailed Dec. 11, 2009.
U.S. Appl. No. 11/586,989 Final Office Action mailed Dec. 9, 2010.
U.S. Appl. No. 11/586,989 Office Action mailed May 11, 2010.
U.S. Appl. No. 11/586,989 Office Action mailed Mar. 30, 2009.
U.S. Appl. No. 11/586,959 Final Office Action mailed Aug. 30 2013.
U.S. Appl. No. 11/586,959 Office Action mailed May 8, 2013.
U.S. Appl. No. 11/586,959 Final Office Action mailed Oct. 5, 2012.
U.S. Appl. No. 11/586,959 Office Action mailed Apr. 27, 2012.
U.S. Appl. No. 11/586,959 Final Office Action mailed Feb. 14, 2011.
U.S. Appl. No. 11/586,959 Office Action mailed Oct. 1, 2010.
U.S. Appl. No. 12/703,188 Final Office Action mailed Oct. 12, 2012.
U.S. Appl. No. 12/703,188 Office Action mailed Apr. 6, 2012.
U.S. Appl. No. 10/924,009 Supplemental Final Office Action mailed Feb. 4, 2009.
U.S. Appl. No. 10/924,009 Final Office Action mailed Dec. 5, 2008.
U.S. Appl. No. 10/924,009 Office Action mailed Jun. 30, 2008.
U.S. Appl. No. 12/717,108 Final Office Action mailed Jan. 31, 2012.
U.S. Appl. No. 12/717,108 Final Office Action mailed Jul. 20, 2011.
U.S. Appl. No. 12/717,108 Office Action mailed Feb. 9, 2011.
U.S. Appl. No. 12/782,678 Final Office Action mailed Jul. 31, 2013.
U.S. Appl. No. 12/782,678 Office Action mailed Jan. 7, 2013.
U.S. Appl. No. 12/782,678 Office Action mailed Oct. 4, 2012.
U.S. Appl. No. 13/013,789 Office Action mailed Dec. 20, 2013.
U.S. Appl. No. 11/588,036 Office Action mailed Jan. 6, 2014.
Fontijn, Willem; AmbientDB: P2P Data Management Middleware for Ambient Intelliegence; Year: 2004; IEEE; pp. 1-5.
U.S. Appl. No. 13/939,178 Office Action mailed Oct. 10, 2013.
U.S. Appl. No. 11/240,655 Final Office Action mailed Nov. 14, 2013.
U.S. Appl. No. 13/191,398 Office Action mailed Dec. 2, 2013.
U.S. Appl. No. 11/452,848 Office Action mailed Nov. 18, 2013.
U.S. Appl. No. 14/028,327 Office Action mailed Nov. 7, 2013.
U.S. Appl. No. 11/586,990 Office Action mailed Nov. 20, 2013.
U.S. Appl. No. 11/586,958 Office Action mailed Nov. 6, 2013.
U.S. Appl. No. 11/586,958 Final Office Action mailed Feb. 14, 2013.
U.S. Appl. No. 11/586,958 Office Action mailed Sep. 30, 2010.
U.S. Appl. No. 12/703,188 Office Action mailed Nov. 21, 2013.
JP 2013-039681, Notification of Reason for Refusal mailed Feb. 12, 2014.
U.S. Appl. No. 11/586,958 Final Office Action mailed Mar. 12, 2014.
U.S. Appl. No. 14/242,664, Murgesh Navar, filed Apr. 1, 2014.
U.S. Appl. No. 11/586,990 Final Office Action mailed Apr. 7, 2014.

* cited by examiner

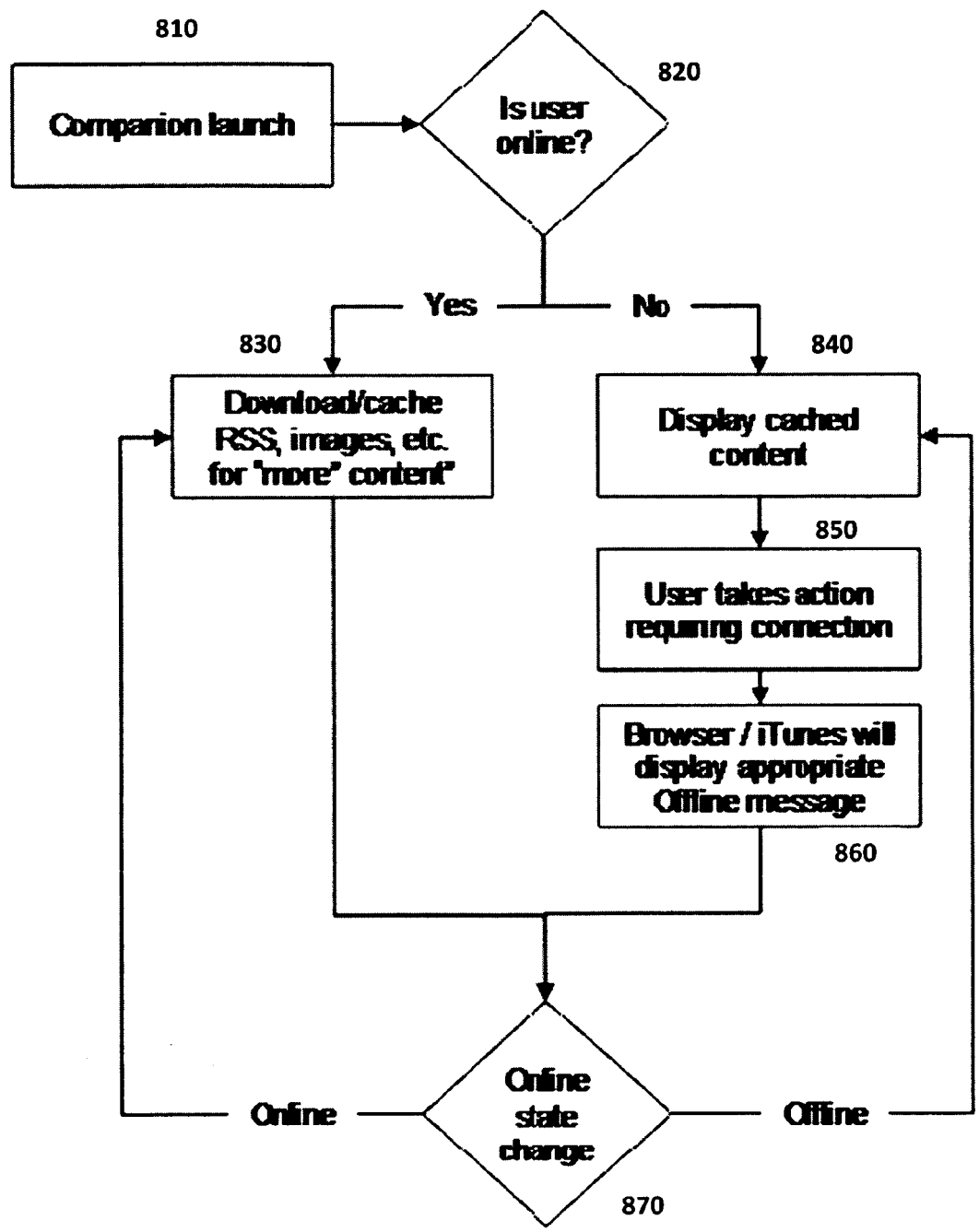

To view what your friend has shared with you, copy and paste the following link into your browser:

[LINK]

VoloMedia enables people to view and share great content that they might not otherwise have access to. We hate spam as much as you do. If you feel you have received this message in error, or that it might be spam, please click this link. [LINK]

DISCOVERY AND ANALYTICS FOR EPISODIC DOWNLOADED MEDIA

CROSS-REFERENCE TO RELATED APPLICATIONS

The present application claims the priority benefit of U.S. provisional patent application No. 61/028,185 filed Feb. 12, 2008 and entitled "Metrics and Management of Downloadable Media," the disclosure of which is incorporated by reference.

BACKGROUND OF THE INVENTION

1. Field of the Invention

The present invention generally relates to subscription-based reception of information over a computer network. More specifically, the present invention relates to the 'podcasting' of media.

2. Description of the Related Art

Podcasting involves syndicated distribution of multimedia content files over a network, typically the Internet. Podcasts may be played back on mobile devices or personal computers. Ordinarily, these content files contain audio or video but may also contain images, text, or other file types such as Portable Document Format (PDF).

Syndicated distribution of content is a format used to associate computer readable files that are available for delivery over a network. The syndication format is also used to provide users with information concerning the subject matter or content of files available for download. Based upon information provided through syndicated distribution, a user may decide to subscribe to delivery of one or more files. Syndication format-aware computer programs can, as a result of the subscription, automatically determine what files need to be downloaded to a subscribing user and then automatically download such files as they become available.

A feed is an association amongst files specified in accordance with a syndication format. A feed is generally used to associate files according to criteria specified by a publisher of the content. Files associated with a feed, for example, may represent episodes of a program in a manner similar to episodes of a television or radio program (i.e., episodic media).

A feed may include a list of Uniform Resource Locators (URLs) by which episodes of a show may be accessed over the Internet. A content provider may post a feed on a web server. This location (i.e., the web server) may be referred to as the feed Uniform Resource Identifier (URI) or feed URL. A feed is ordinarily updated each time a new episodic media (e.g., a new episode or media file) is published and made available. Alternatively, a feed may be associated with files based upon more arbitrary criteria such as files corresponding to the favorite songs of a particular blogger.

The Real Simple Syndication (RSS) and Atom formats are two examples of popular feed formats. The RSS format is an example of a simple Extensible Markup Language (XML) based format that allows users to subscribe to content available for download from network sites such as websites on the Internet. An RSS feed includes an association of files using the RSS format. An Atom feed, in turn, operates in a fashion similar to that of the RSS format and includes an association of files using the Atom format.

A computer program known as an aggregator, which may sometimes be referred to as a 'podcatcher' or podcast receiver, is used to subscribe to and manage subscriptions to feeds. Upon execution of the aggregator program, application, or module by a processor at a computing device, the aggregator monitors a set of feeds for a user. The aggregator downloads file updates (e.g., new episodes) at a specified interval, for example, every two hours to the extent file updates are available. A downloaded file, such as an episode of a television show, can then be played, replayed, and/or archived.

RSS, as noted above, is an example of an XML-based feed format that allows users to subscribe to content provided by their favorite websites. Using RSS, a webmaster can host content in a standard file format such as mp4 or mp3. The content can then be consumed and organized through RSS-aware software such as the aforementioned aggregator application.

In accordance with the RSS 2.0 standard, the web address of a file such as a media file may be contained in an enclosure tag of an item in an XML file. In a similar regard, two constituent elements of a typical RSS feed are the channel element and the item element. Both the channel element and the item element may include a variety of sub-elements; the item element is, in many instances, a sub-element of the channel element. A channel may contain any number of items. An item may be complete in and of itself as inclusion of elements in an item are optional. The following list exemplifies some RSS channel elements with a brief description and example of each element.

| Element | Description | Example |
| --- | --- | --- |
| Title | The title of the item. | Excellent New Song |
| Link | The URL of the item. | http://publication.com/2006/10/18EAF.html |
| Description | Brief description of the item | The Excellent New Song was released to critical acclaim. |
| Enclosure | Description of an object attached to the item. | Has three required attributes. url indicating where the enclosure is located, length indicating size in bytes, and type indicates file type is, e.g. standard MIME type. <enclosure url="http://www.videoname.com/mp4s/firstsong.mp4" length = "13217840" type = "video/mpeg" I> |
| Guid | Globally unique identifier, a string that uniquely identifies the item. When present, an aggregator may choose to use this string to determine if an item is new. | <guid>http://arbitraiy.server.com/weblogItem5050</guid> |
| Source | RSS channel where the item came from. (The purpose of this element is to propagate credit for links) | <source url="http://www.musicreview.org/links2.xml">moviereview's location </source> |
| Dest | Pointer to location of analytics engine. (the purpose of this element is to enable publishers to track actual usage of their downloadable media) | <dest url=http://www.myanalytics.com/ma.js </dest> |

Podcasting provides a superior paradigm for delivery of information over computer networks. As podcasting has become an increasingly established format for the delivery of audio and video content over the Internet, podcasting has likewise created the need for new mechanisms that operate to the mutual benefit of content owners and consumers. An example of such a need and one that remains unmet by the current state of the art is media metric discovery and reporting.

When a video is played online using a web browser, media usage is measured on the connected web server and within the browser embedded media player. In one example involving the Flash media player, Javascript code embedded within the web page is typically in communication with an online analytics engine such as Google Analytics.

Podcast media, however, is typically downloaded for time-shifted playback and off-line consumption. In these instances, a podcast video might be played using a standalone media player such as iTunes®, which does not typically support the embedding of Javascript along with the media. iTunes®, too, does not allow for playback measurements to be connected to an online analytics engine.

The growing popularity of podcasting has created a need to make downloaded media consumption more easily measurable for content owners and to create a corresponding set of consumer features around seamless sharing and discovery of podcasts.

SUMMARY OF THE CLAIMED INVENTION

Systems and methods for discovery and analysis of episodic media.

BRIEF DESCRIPTION OF THE DRAWINGS

FIG. 8B illustrates a method for operation of a three button companion, specifically the "more" function.

DETAILED DESCRIPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Embodiments of the present invention concern a system and method for matching selected information, such as advertising information, to media content/user combinations in which information and content are delivered to a user over a network. Such embodiments may facilitate an online marketplace in which providers of media content and ad providers match ads with content and with online users who receive or subscribe to receive the content. The online marketplace may provide a venue in which content providers and advertisers can find out about the offerings of one another user profiles and preferences thereby facilitating agreement of ads with content and users.

Content providers provide media content, which may comprise sound, motion pictures, or a combination of both. A motion picture may represent real-life images or computer generated images such as video game environment. Media content may comprise music, news reports, talk shows, weather reports, traffic reports, video dips, and radio/TV like programs, which may be referred to as episodic media.

Media content may be organized into periodically updated content channels. A talk show channel, for example, may be updated with the latest interview. A weather channel may be updated with a new weather report. Content providers may use a network such as the Internet to designate criteria for associating their content with ads.

Computer Code Table A, which appears prior to the claims, identifies computer program code that may be used in the implementation of some embodiments of the present invention. The "Get Podcast" code comprises automatically generated JavaScript that can be attached to a content provider's web site to provide a link that permits visitors to the content provider's web site to easily sign up for the content subscription service, and install media player plug-in software that enhances discovery and sharing of downloaded subscription media.

Figure 1:
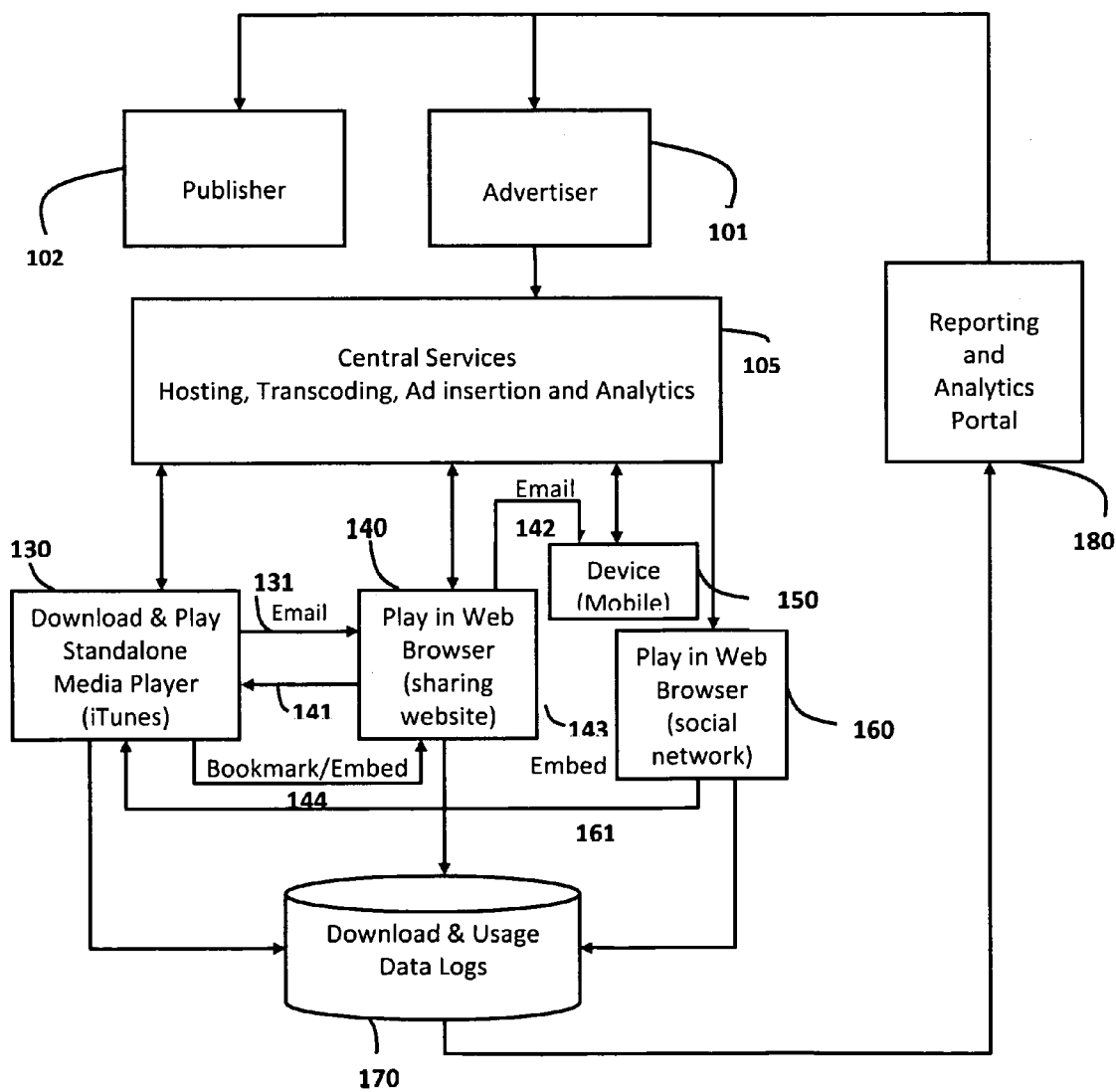
FIG. 1 illustrates a system for sharing content amongst users with disparate means of consumption including devices all the while capturing usage logs for analytics and reporting.

FIG. 1 illustrates a system 100 for sharing content amongst users with disparate means of consumption including devices all the while capturing usage logs for analytics and reporting. An advertiser 101 feeds the system 100 with advertisement media content and campaign rules governing distribution of that content. Publisher 102 feeds the system 100 with information and/or media content, which may include episodic media (e.g., video clips, series of interviews, and other multimedia content) along with associated metadata.

Central Service Provider 105 matches ad media with content media. Matching of content media from publisher 102 may be matched with advertisement content from advertiser 101 based on the campaign rules provided by advertiser 101. For example, an advertiser may desire to have their advertisement content (e.g., for a sporting goods store) inserted only in the context of sports related content (e.g., a baseball game). The Central Service Provider 105 inserts the advertising media file within the content media file to create a newly modified, ad-infused media content file. Such insertion process may require re-encoding (e.g., transcoding) the advertising file, the content file, or both the advertising and content file to a uniform matching profile. Central Service Provider 105 may be a single operating entity or a loose affiliation of or wholly unaffiliated group of computing devices and/or software applications offering ad matching and related services.

Once a uniform matching profile is created, the content file is split into two parts: Part I and Part II. The split occurs at the location where the advertisement is to be inserted. For example, a content file may be split 1 minute from the start of a video that is 30 minutes long. Part I is now 1 minute long whereas Part II is 29 minutes in length. The end of Part I of the content file is then stitched to the beginning of the advertisement file and Part II of the content file is stitched to the end of the advertisement file thereby creating the ad-infused content file. Any number of ads can be inserted into any number of locations within a content file. As such, a content file may be split into any number of parts or segments.

Several variants of the modified content file may be created thereby addressing different types of content. For example, sporting good advertisements may be 'stitched' into football content whereas feminine product advertisements may be introduced into women oriented content.

Other variants may also be created through a similar re-encoding process to address compatibility for different types of devices. For example, a smaller phone screen may require a different encoding format than a file formatted for a personal computer screen. The modified content file may then be made available for delivery on a content hosting server at the Central Service Provider 105.

Modified content downloaded from a hosting server at Central Service Provider 105 may be consumed by a variety of devices with any variety of device settings. For example, content may be consumed at a personal computer (140) by a user utilizing a web browser to visit a website through entry of a URL and selecting a 'play button' in an embedded web media player. The user may then immediately start watching the video content file stored on a content hosting server.

Another user, however, may manually or automatically download a version of this same video file to a standalone media player (130). An example of such a standalone player is the podcast application software found in iTunes®. The user may also watch the video at a later time by downloading the file in a format for a particular mobile media device (150).

Still other users may watch content through a web-based media player embedded in a social networking site (160) such as MySpace. The social network site 160 may not actually host the content notwithstanding the fact that the content may be viewed at the site. For example, the actual host of the content may be YouTube. MySpace may operate as a portal that embeds content otherwise hosted on a YouTube server. For example, a designer of the social network site portal may use an embedded source call as follows, which not only retrieves the content from a server at the Central Service Provider 105 but also calls for the content to be rendered in a Flash media player:

<embed src="http://www.youtube.com/v/B2qo2bVlORc&hl=en&fs=1" type="application/x-shockwave-flash" allowscriptaccess="always" allowfullscreen="true" width="480" height="295"></embed>

But for the presently disclosed system 100, this fragmentation of audiences and media consumption behavior might otherwise be problematic for publishers 102 and advertisers 101 who each desire to seamlessly reach audiences of scale without having to deal with the intricacies and peculiarities of each platform. Such peculiarities, for example could include video formats and encoding resolution. The system 100 of FIG. 1 addresses this problem by automatically encoding and transcoding publisher 102 and advertiser 101 content such that it is compatible with different platforms.

Further illustrating this disparity amongst users and means of content consumption- and thus further highlighting the benefits of the present invention-a user operating with standalone media player 130 might share a video via email 131. The recipient of the email 131 may watch the video in a web media player 140 at, for example, a website operated by the content owner. Some recipients of the email 131 could decide to download 141 the video to their standalone media player 130 while others might decide to showcase the video within a web video player on their social network profile page 160 using embedded code 143. Still others may decide to email 142 the video to their friends who would then receive the email on a mobile media device 150 such as an iPhone, which includes one or more built-in media players. A visitor to the social network site 160 may find the displayed video entertaining or informative and elect to subscribe (or immediately download) 161 to the corresponding channel in order to automatically receive subsequent and future updates of the content in their standalone media player 130. Another user, still, could bookmark 144 (or embed) the content at another site having a web media player (140) such as a personal website or a website associated with bookmarked content.

Movement of consumption of a single video multiplied by the millions of users consuming thousands of videos on tens of different platforms results in the aforementioned need for a comprehensive measuring analytics and reporting system for publishers 102 and advertisers 101. The present invention may capture media usage from a variety of media players 130, 140, 150, and 160 and corresponding content servers (e.g., servers as Central Service Provider 105) for analysis and creation of insightful reports. Such data may be stored at database 170.

Irrespective of how content is consumed, usage measurements may be made when the content is consumed. Standard web logs may provide measurements of content downloaded from the hosting servers at Central Service Provider 105. Playback logs may also be maintained and acquired from each of the aforementioned media players/device (130, 140, 150, and 160). Reports may be generated based upon all captured events and stored in aforementioned database 170.

These reports are made accessible via an online analytics and reporting portal 180. These reports may be accessed by publishers 102 and advertisers 101 to make determinations concerning the success of advertisement campaigns, the desirability of content, and the success of integrating the two forms of content (ads and entertainment/information). Portal 180 may present data from database 170 to publisher and advertiser accounts as part of a single comprehensive account in order to manage the entire information about the content as well as schedule ad campaigns.

Figure 2:
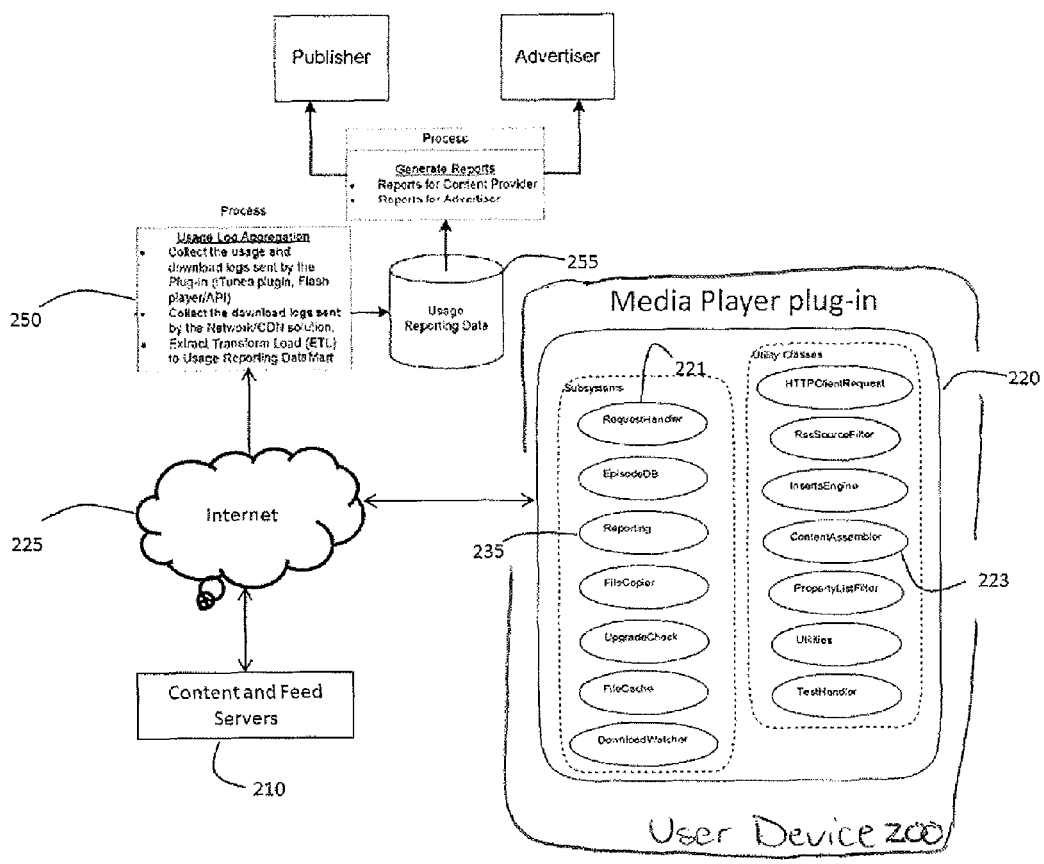
FIG. 2 illustrates a user device including a plug-in for ingesting content and feeds and generating data logs for analytics and reporting systems.

FIG. 2 illustrates a user device 200 including a plug-in 220 application for ingesting content and feeds and generating data logs for analytics and reporting systems. User device 200 is inclusive of any device capable of acquiring and allowing for consumption of content. For example, user device 200 may be a mobile device 150 as referenced in FIG. 1. User device is also inclusive of computing devices operating media players/browser devices 130, 140, and 160 in FIG. 1 as well as user device 406, as that device is discussed in the context of FIG. 4. Plug-in application 220 is a lightweight software application executable by the processor of a computing device such as user device 200. Plug-in application 220 may encompass various subsidiary software modules such as reporting module 235, content assembler module 223, and request handler module 221.

The content and feed servers 210 may be part of the central services 105 as referenced in FIG. 1 or may be hosted elsewhere. Content servers host the media file and serve the content upon receipt of a request generated by execution of the request handler module 221 contained in the plug-in application 220. The feed servers hold the RSS feed, which is a text file in XML format. A podcast application, such as iTunes, will receive the feed from the feed server at the time of subscription. The RSS feed holds information on the location of the media file hosted on the content server.

Execution of the plug-in application 220, generates the aforementioned request for the RSS feed. The application 220 then transforms delivers the modified feed to the podcast application thereby resulting in the addition of a channel subscription. Execution of the plug-in application 220 offers the user enhanced mechanisms to easily discover and share attractive content through a graphical user interface, while managing content and feeds alongside the media player and collecting precise usage (e.g., playback) events from the corresponding media player. The usage events are then delivered to a reporting and analytics service 250 via a communications network 225 such as the Internet for further analysis. The usage data could also be sent to multiple reporting services; each RSS feed may specify data to be sent to a different reporting service.

Figure 5:
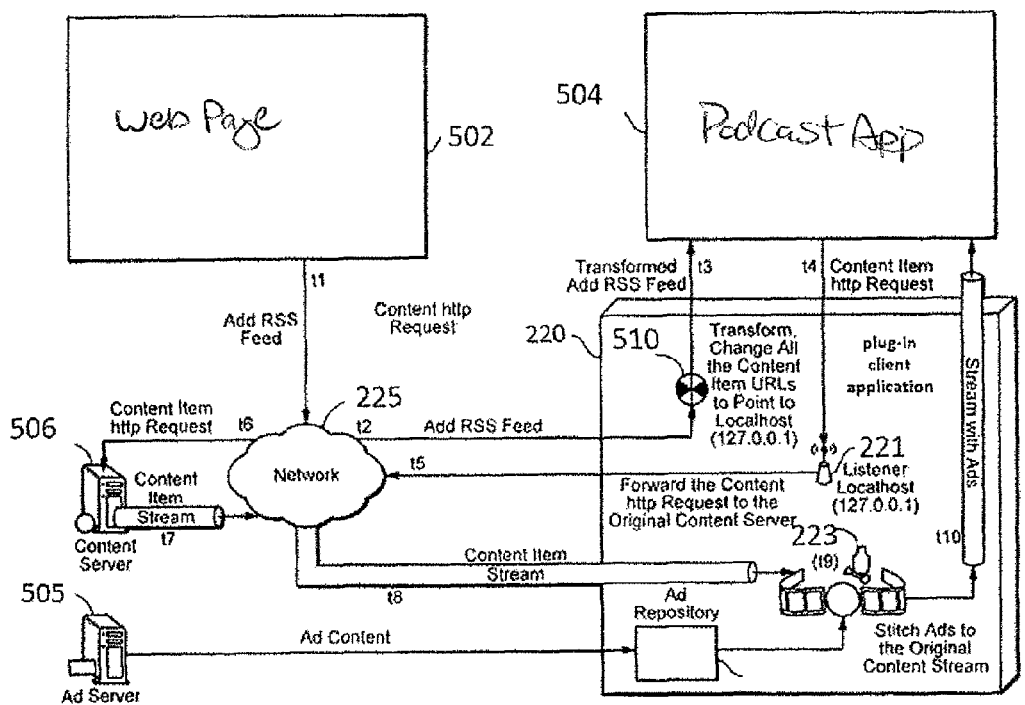
FIG. 5 illustrates a system to deliver RSS subscription content to a user

Execution of the content assembler 223 causes the plug-in application 220 to receive content from a publisher 102 or content server 506 (as illustrated in FIG. 5), advertisements from an advertiser 101 or advertising server 505 (also illustrated in FIG. 5), and insert the advertisement into the content to create an ad infused media file. Expired advertisements, too, may be removed with a new advertisement inserted in its place. Content assembler 223 splits the content file into two parts as described above whereby the end of a first part of the content file is stitched to the beginning of the advertisement file and the second part of the content file is stitched to the end of the advertisement file. The content assembler 223 can assemble any number of ads into any number of locations within a content file.

The reporting module 235 of the plug-in application 220 is executed at the user device 200/406 to collect media usage data. When reporting events to a usage information gathering server 250 (also illustrated as server 403 in FIG. 4), usage data may be associated with a unique User ID. The User ID may be generated and issued by the usage information gathering server 250/403. The User ID allows the server 250/403 to correlate usage to user while maintaining anonymity and privacy of the actual user. The usage information gathering server 250/403 further aggregates user and usage logs including data from the content server and feed server web logs. Aggregated data may be maintained at a database 255, which also corresponds to the database 170 of FIG. 1.

The following list exemplifies events collected and sent to a usage information gathering server

| EVENT | CODE |
| --- | --- |
| episode download success | cc |
| episode download failure | ce |
| channel subscribed | af |
| initial add feed | ia |
| episode play | pl |
| episode play count | pc |
| episode play count on device | pd |
| ad playback | vl |
| ad full playback | vc |
| buttons shown | bs |

-continued

| EVENT | CODE |
| --- | --- |
| share episode | sh |
| share view | sv |
| bookmark episode | bm |
| bookmark view | by |
| open more tab | mo |

Figure 3A:
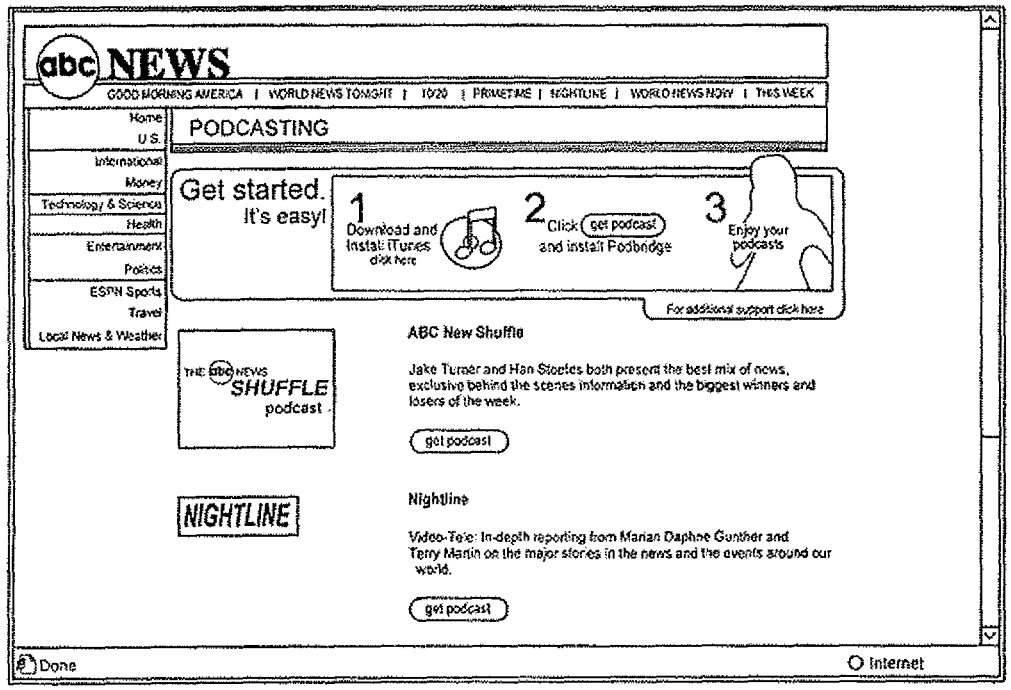
FIG. 3A illustrates an interface to add an RSS content subscription.
Figure 3B:
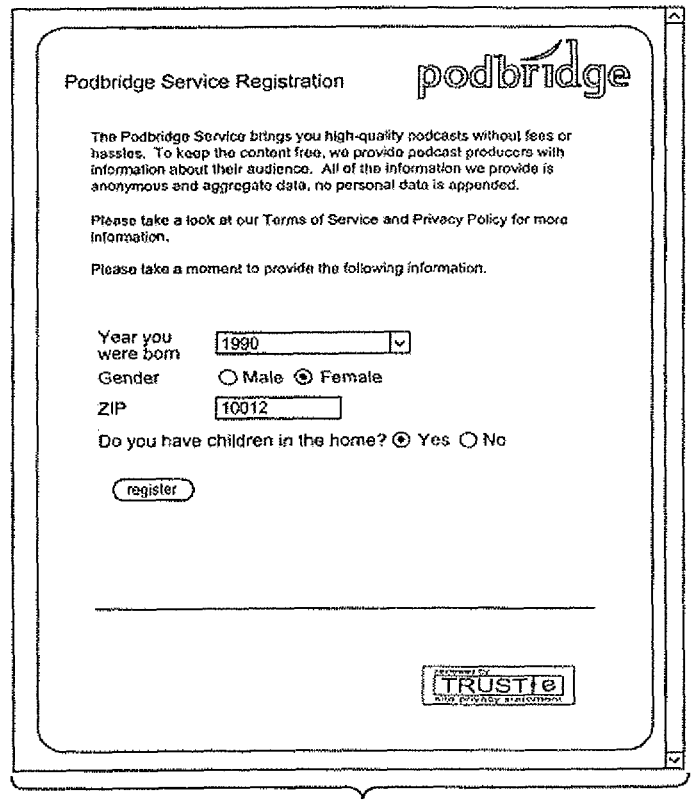
FIG. 3B illustrates a graphical user interface (GUI) for a registration profile gathering server.

FIG. 3A illustrates an interface to add an RSS content subscription whereas FIG. 3B illustrates a graphical user interface (GUTI) for a registration profile gathering server. The GUIs of FIGS. 3A and 3B may be used by the user device 406 of FIG. 4 (and the user devices of FIG. 1) to interact over a network 225 (as illustrated in FIG. 4) with a registration profile gathering server 402.

FIG. 3A illustrates that the content provider web page may include various information and a "Get Podcast" button, which may have been added using the copy and paste process set forth in the computer code listed in Table A. Upon a user actuating the "Get Podcast" button on the web site of a content provider or on the web site of the intermediary, the browser is redirected to a web page of the intermediary site that provides the registration information request shown in FIG. 3B. Registration information may generally include user attribute information but is also inclusive of requests for user acceptability rules that indicate the kinds of information that the user does and does not want to receive. User acceptability rules can be used to recommend particular types of content. While only one user registration screen is illustrated in FIG. 3B, more than one screen may be used.

Following a subscription process, which may take place through the interface illustrated in FIG. 3A, the plug-in application (220 of FIG. 2) is downloaded from a software download server such as a web server. Once the plug-in application 220 has been installed and executed for the first time, the application 220 triggers a request to the user to provide user profile information via an interface like that illustrated in FIG. 3B.

Figure 4:
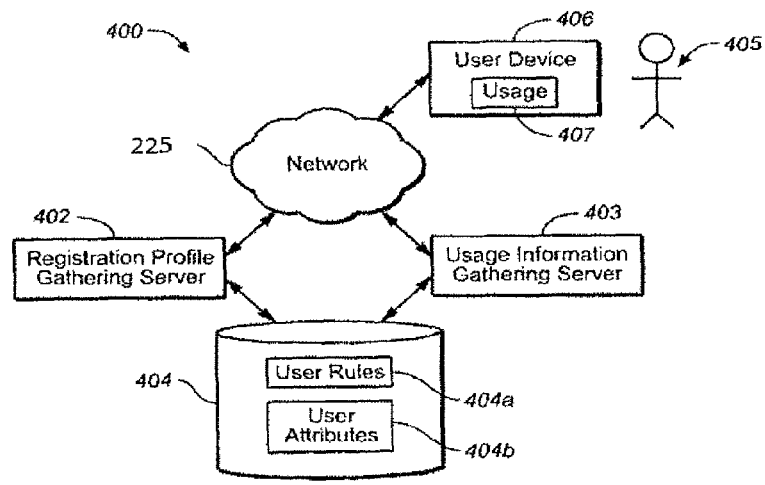
FIG. 4 illustrates a user and usage information gathering system.

User profile information may be provided via the user device 406 of FIG. 4 (or a corresponding user device as illustrated in FIG. 1) over the network 225 to the registration profile gathering server 402. The plug-in application then downloads content from a content server (e.g., content server 506 of FIG. 5). Content server may be any content server specified in an RSS feed subscribed to by a user. A JavaScript subscription function (e.g., the VoloMediaSubscribe ( ) function of Table A) is run on the user device 406 and ensures that the user device 406 has the client-side plug-in application installed. The actions initiated by user actuation of the Get Podcast button of FIG. 3A include checking if the plug-in application module is installed. If the plug-in is not installed, an installation file is downloaded and executed followed by a registration process.

FIG. 4 illustrates a user and usage information gathering system 400. A user 405 operates a user device 406, which is inclusive of personal computers, personal digital assistants (PDAs), an iPod from Apple Inc. or other portable media devices such as a PlayStation Portable from Sony Computer Entertainment Inc., which permits the downloading of content over a network 225 such as the Internet. System 400 gathers user registration profile information when user 405 first registers to receive certain content. In addition, the system 400 periodically gathers user usage information indicative of content and advertisements obtained or subscribed to by a user.

User registration profile gathering server 402 gathers user profile information over the network 225 during user registration. Server 402 may be a web page server that serves up web pages to a browser enabled user device 406 over the network 225 to solicit user preferences and/or rules during registration of the user 405. Usage information gathering server 403 periodically gathers user usage related information over the network 225.

In one embodiment, a user device 406 runs an application 407 (e.g., plug-in application 220) that gathers usage information and periodically uploads that information over the network 225 to the user usage information gathering server 403. The usage information upload may be automated thereby obviating the need for user interaction.

The system 400 also includes a storage repository 404 to store user-related information. The user-related information may include user acceptability rules 404a that express preferences of user 405. Such preferences may be absolute such as what type of information a user absolutely does or does not want to receive. Alternatively, rules 404a may be flexible and merely indicative of preferences.

The user-related information may also comprise user attributes 404b that express user qualities or characteristics. User attributes may comprise gender, age, listening and/or viewing habits of a user. Attributes may further include geographic information such as zip code or whether or not the user 405 has children.

FIG. 5 illustrates a system 500 to deliver RSS subscription content to a user. System 500 may combine ad campaign provider ads into content provider content. A web page 502 is displayed by a PC web browser. The web page 502 is associated with a content provider. A content provider content server 506 serves content in response to RSS feed requests.

At time=t1, a user actuates a link on web page 502 to request an RSS feed associated with content served by content server 506. In response to the request, at time=t2, the RSS feed is delivered over the network 225 to the podcast application 504.

A transform function 510, which is a part of the plug-in application 220 running on the user device (user device 406 of FIG. 4) receives the RSS feed and changes all content URLs to point to local host (127.0.0.1). At time=t3, the RSS feed with the transformed URLs is delivered to the podcast application 504, such as iTunes® running on the user device. The content provider web page 502 includes a "get podcast" button associated with JavaScript used to download the plug-in 220 like that discussed in the context of FIG. 2 and acquired via an interface like that of FIG. 3A. When a user selects the "get podcast" button, the user is asked for permission to install the plug-in client 220 if it was not previously installed. If the client has already been installed, the client takes control and adds the feed to the podcast application 504.

At time=t4, the podcast application 504, such as iTunes initiates an update of content associated with the RSS feed. The request is intercepted by the request handler module 221 of the plug-in application 220 illustrated in FIG. 2. Request handler 221 includes a listener on local host (127.0.0.1), which 'listens' on the local host IP 127.0.0.1 and intercept calls by the iTunes® application or any other media manager application.

At time=t5, the request handler module 221 forwards the intercepted request over the network 225 to a content server 506. At time=t6, the content server 506 receives the request sent by the content assembler module 223, which is also illustrated in the context of the plug-in application 220 of FIG. 2. At time=t7, the content server 506 returns the requested content over the network 225 to the content assembler module 223.

At time=t8, the content assembler module 223 receives the requested content update. At time=t9, content assembler module 223 inserts advertisements into the newly arriving content if an advertisement is available to be inserted. At time=t10, the original content or the modified ad infused content is streamed to be played or to be stored as a content file for later playback in the podcast media player application 504.

The original RSS XML is transformed by the management plug-in (after download) to point all the URLs of the files, such as content files, to the "local server" (127.0.0.1) so that all podcast manager application content requests for this RSS will be directed to and handled by the plug-in (client application). The podcast management plug-in listens on a local host port and intermediates in content requests by the podcast manager application. Each RSS feed may represent a podcast content feed with a list of episodes. In one example, there exists one RSS feed per podcast subscription, which is similar to a virtual channel. The client-side plug-in intervenes each time the user clicks on a "Get Podcast" button for each feed by rewriting address elements within each RSS feed (e.g., changing address to 127.0.0.1:port) before handing it off to the podcast manager application. For example, if a user subscribes to 100 feeds/channels, then there are 100 RSS feeds for which the client-side plug-in intervenes.

The podcast manager application requests a file from the RSS feed. The management plug-in intercepts the feed request, which has been modified to point to the request to the local host. The management plug-in, rather than the podcast manager application, forwards the request for the file indicated by the RSS feed. The plug-in generates a new http request for the file from the server such as the content server 506. A content server that hosts the content can be either hosted within the central services provider 105 of FIG. 1, by a content provider, or by an intermediary. The plug-in intercepts file requests from the podcast manager application (to 127.0.0.1:port) and rewrites each such request so that the content server 506 receiving the request sends requested content back to the management plug-in rather than sending it directly to the podcast manager application.

The following is an illustrative example of the intermediation of the management plug-in application in the retrieval of a content feed. A user requests that a content feed be added by clicking an icon on a user device interface. The request is captured by the management plug-in software, which changes the original URL of the file in the RSS feed. For example, http://www.somesite.com/podcast/channels/morningnews.mp4 may be changed to http://127.0.0.1:10930/?getitem_www.somesite.com/podcast/channels/morningnews.mp4. The full original URL of the file is stored as an argument after the "getitem_." Subsequently, a user may request a file from that RSS feed. Thus, the podcast manager uses the changed URL—http://127.0.0.1:10930/?getitem_www.somesite.com/podcast/channels/morningnews.mp4 to actually make the call for the file. The plug-in software remains listening on the address 127.0.0.1:10930, however. The plug-in captures the request and generates a request to a content server that serves the requested RSS feed, using the original URL that is stored as an argument after the "getitem_." (i.e., www.somesite.com/podcast/channels/morningnews.mp4). Alternatively, the plug-in application could also be implemented and directly used on user devices with Internet Protocol (IP) capabilities. These devices do not need to use an intermediate podcast manager application (e.g., iTunes) for content syncing as they can obtain the RSS and the content directly from the network, such as the Internet.

Figure 6:
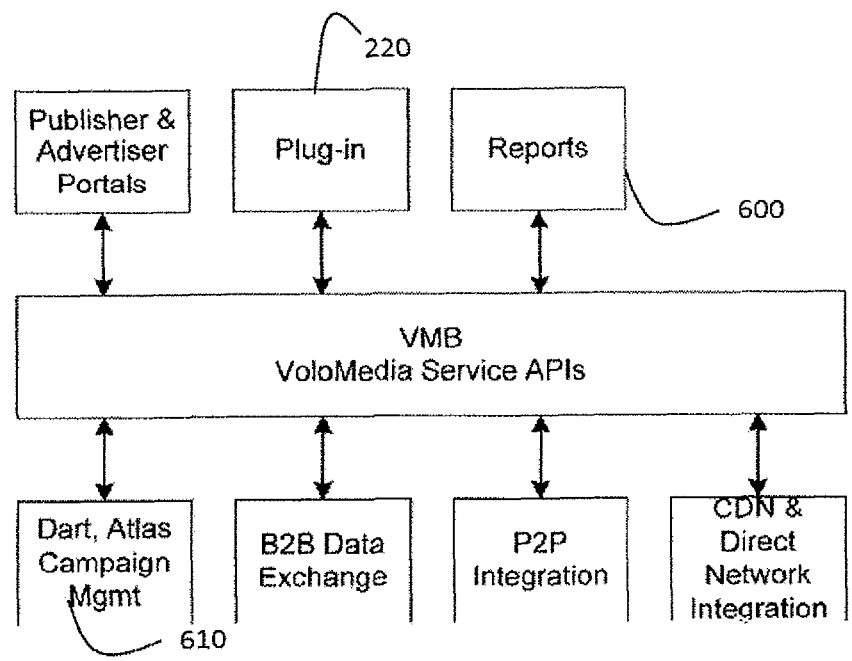
FIG. 6 illustrates a modular architecture coupling a user device plug-in to analytics, distribution, media, and campaign management systems.

FIG. 6 illustrates a modular architecture coupling a user device plug-in 220 to analytics, distribution, media, and campaign management systems. In one example, a plug-in application 220 operating in an iTunes® environment determines when an episode or advertisement has played and reports such data to other subsystems. The plug-in reporting module (235 of FIG. 2) logs data about the played file along with data concerning the starting offset and duration of the playback event. Reporting module 235 further analyzes the advertisements that were inserted into the content file to determine which advertisements and content were viewed by the user.

In the present example, the plug-in reporting module 235 makes use of the iTunes® music library xml file to determine the play counts for any given episode. By keeping track of the playback events from the reporting system and looking at the playback counts listed in the iTunes® music library file, the plug-in is also able to determine how many times an episode was played on a corresponding iPod device. Using application interfaces built on the HTTP protocol, the plug-in application 220 can communicate detailed iTunes® playback data to external advertising systems 610 such as Doubleclick's DART or any other third party reporting system 600 (e.g., reporting and analytics systems 180 of FIG. 1).

The location of the analytics and reporting system may be specified in the form of a URL included in an RSS feed item element. The URL pointer to the analytics and reporting system may likewise (and in a real world implementation) be passed on to the plug-in application 220 as an argument to the VoloMediaSubscribe( ) function as referenced in Table A. The RSS feed of the subscribed channel is an argument to the VoloMediaSubscribe( ) function call from Table A. Usage data, including play events, related to the RSS feed is sent over HTTP protocol to the analytics and reporting system. In a still further example, the location URL of the reporting system is specified within the header of the media file.

Some embodiments of the present invention include providing for viral syndication by allowing the user to share downloaded media with friends and associates. Sharing may take place through a graphic or text overlay associated with the downloaded content. The overlay may indicate options for bookmarking, sharing, and/or requesting/finding more content with similarities to the downloaded content.

Embodiments of the present invention may be integrated with various bookmarking services, email services, and media player environments. If a user chooses to bookmark a media file, the user may be presented with a menu of bookmarking services associated with the user. The user may then designate a particular bookmarking service (e.g., Google Bookmarks) and information concerning the bookmark may automatically be sent to the user account on the bookmarking service. Bookmarking may include storing and retrieving information concerning the website from which the content was downloaded, inviting friends to view the bookmarked (favorite) video clips, and copying and sending such information to various other bookmark services such as Google Bookmarks, del.ici.ous, and Digg.

If a user wishes to share a media file, emails with information concerning the media file (e.g., media URLs) may automatically be generated to send to friends and associates. Sharing the content may also include sharing the bookmark or 'pushing' the downloaded content back onto the Internet. If the user requests similar content, the similar content may be delivered to the particular media environment in which the user made the request. For example, the user may be watching a video file on iTunes® and request content similar to that of the video file just consumed. Similar content may then be added to iTunes® including a subscription. The information concerning sharing, bookmarking, and searching for similar content may be captured and analyzed for reports to advertisers and/or content publishers.

Publishers or content owners may likewise recommend similar content to users. For example, a user may watch a program from ABC News. A publisher or content provider (which may be the host of the ABC News program) may identify similar content, individual shows, or channels and recommend the same. Recommended content may then be added to a particular media environment (e.g., iTunes®) for downloading by clicking a single button or added as a RSS subscription when a channel is recommended. Publishers may recommend content to users who may or may not be connected to the Internet or those users who are not currently visiting the website of the content provider. Publishers may also recommend content to users based upon their demographic information (e.g. age, gender, or location) or upon their behavioral information (e.g. types of content the user watches).

Sharing of content initiated at one platform such as iTunes® but consumed on another platform such as through a Flash video player while preserving an advertiser's and/or publisher's ability to present freshly inserted advertisements at the time of consumption are further provided by embodiments of the present invention. A podcast publisher may likewise track the consumption of a video or other content file when played within a standalone media player such as iTunes® by using any online web based analytics and reporting engine. The movement and consumption of video files from downloads to online, across different online locations, and from online to download may be tracked thus producing detailed analytics of the movement and consumption of media.

Figure 7:
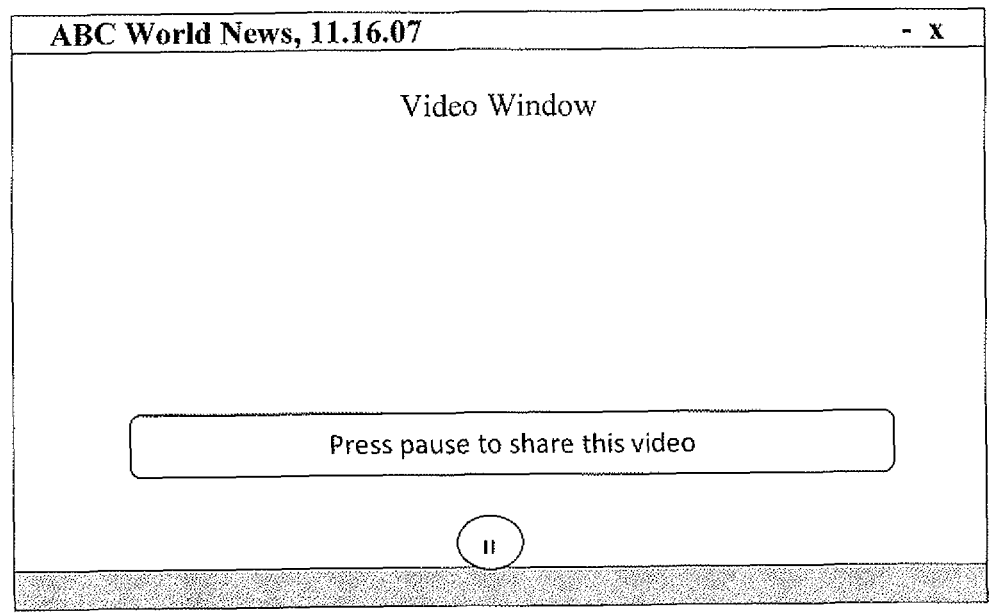
FIG. 7 illustrates an interface for invoking the sharing of downloadable media.

FIG. 7 illustrates an interface for invoking the sharing of downloadable media. When a user wishes to share, bookmark, or find other related videos, pressing the pause button is a first step to invoking sharing and discovery functions. FIG. 7 illustrates an invitation to a user consuming the content to press the "pause" button to trigger presentation of a three-button-companion interface.

Figure 8A:
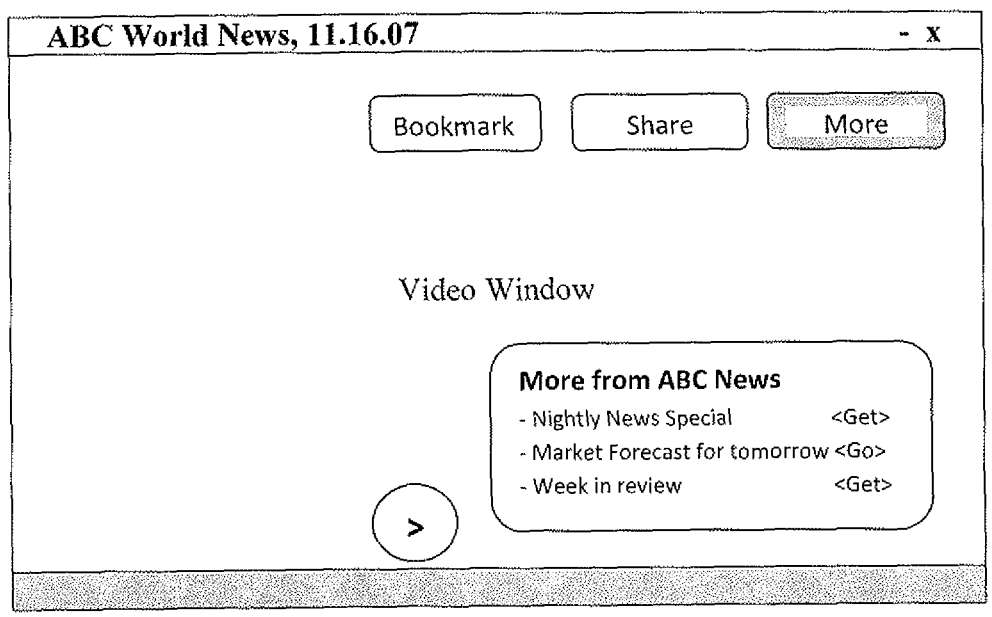
FIG. 8A illustrates a three-button-companion graphical user interface to a user, specifically a highlighted "more" function.

FIG. 8A illustrates a three-button-companion graphical user interface to a user, specifically a highlighted "more" function. Through this interface, which may be displayed to a user on a corresponding user device (for example, user device 406 of FIG. 4), a user may obtain related information or recommendations based upon metadata in a current content file or information within a corresponding RSS feed. The interface allows the related information or recommendations to be obtained over a network while the user is downloading the content or when the user has cached the content for later use when the user is offline as is discussed with respect to the FIG. 8B. The interface of FIG. 8A is, in one embodiment of the present invention, displayed to the user when the user pauses the media file in the context of FIG. 7.

FIG. 8B illustrates a method for operation of a three button companion, specifically the "more" function. The flow diagram also depicts the ability of the system to notify the user if a given action requires network connectivity and to act upon that action once the user returns to an online state. In step 810, the interface (like that of FIG. 8A) is launched. Launch of the interface companion may occur as a result of selecting 'pause' as discussed in the context of FIG. 7. A determination is then made, in step 820, as to whether the user is on-line or off-line. RSS, images, and "more" content are downloaded and cached in step 830 for current and/or later display if it is determined that the user is on-line. If the user is determined not to be on-line, previously cached content is displayed in step 840. If the user initiates an action that otherwise requires an on-line connection (step 850), then the browser or media application (e.g., iTunes®) will display an appropriate message indicating the present off-line state in step 860. Should there be a state change with respect to connectivity as determined in step 870, the appropriate steps of the flowchart are then followed.

With respect to steps 830 and 840, the interface is populated with both related information as well as recommendations that are obtained either from the network or from a local cache that was obtained while the media file was being downloaded. The location of the related information and recommendations may be specified in the form of a URL included in an RSS feed item element. Both the related information and the recommendations may themselves contain metadata that allows a user to further act upon the information.

In one example, selecting related information or a recommendation may cause the user device to download additional media files from the network. In another instance, selecting the related information or recommendation may cause the user device to display additional information about the media file. This additional information may be in the form of a web page that is displayed on the device or the additional information could be displayed in the form of a graphical user interface laid over an existing interface. Metadata that would cause additional media files to be downloaded may be labeled 'Get' and metadata that would cause additional information to be displayed would be labeled 'Go'. Examples of both types of metadata are illustrated in FIG. 8A.

Interactions of the user with the user device may immediately be sent over the network to a usage information gathering server (such as gathering server 403 of FIG. 4) or can be locally cached to be sent at a later time. Examples of the actions that could be sent include the user selecting the 'More' interface element to display related information and recommendations. Other examples of actions that could be sent include the user selecting a 'Go' or 'Get' interface element.

A URL location pointer passed on to the plug-in application as an argument in the VoloMediaSubscribe( ) function and illustrated in Table A is invoked on selection of the 'More' interface element. Selection of the 'More' interface element invokes a URL included in the RSS feed as an item element. The 'More' URL may be specified within the header of the media file. Selection of the 'Get' interface element by the user may add an associated RSS feed as a new channel subscription.

Figure 9A:
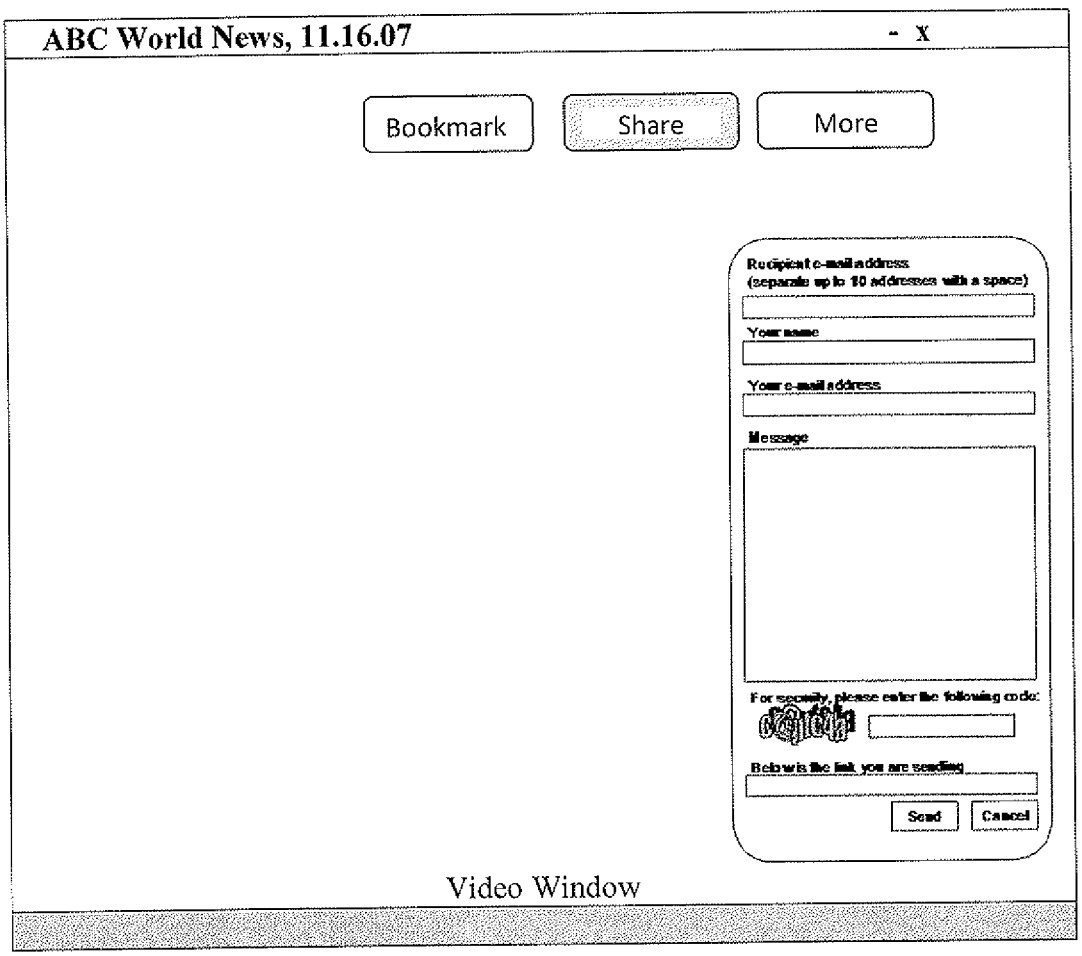
FIG. 9A illustrates a three-button-companion graphical user interface, specifically a highlighted "share" button.

FIG. 9A illustrates a three-button companion graphical user interface, specifically the highlighted "share" button. The "share" button allows for the emailing of a video from within a standalone media player. In the interface of FIG. 9A, the user is presented with a form user interface that includes fields to list recipient email addresses, the name and email address of the user sending the content, and a message. In this example an optional captcha form is included to help validate that the user is a valid person and not a computer program.

Figures 9B, 9C:
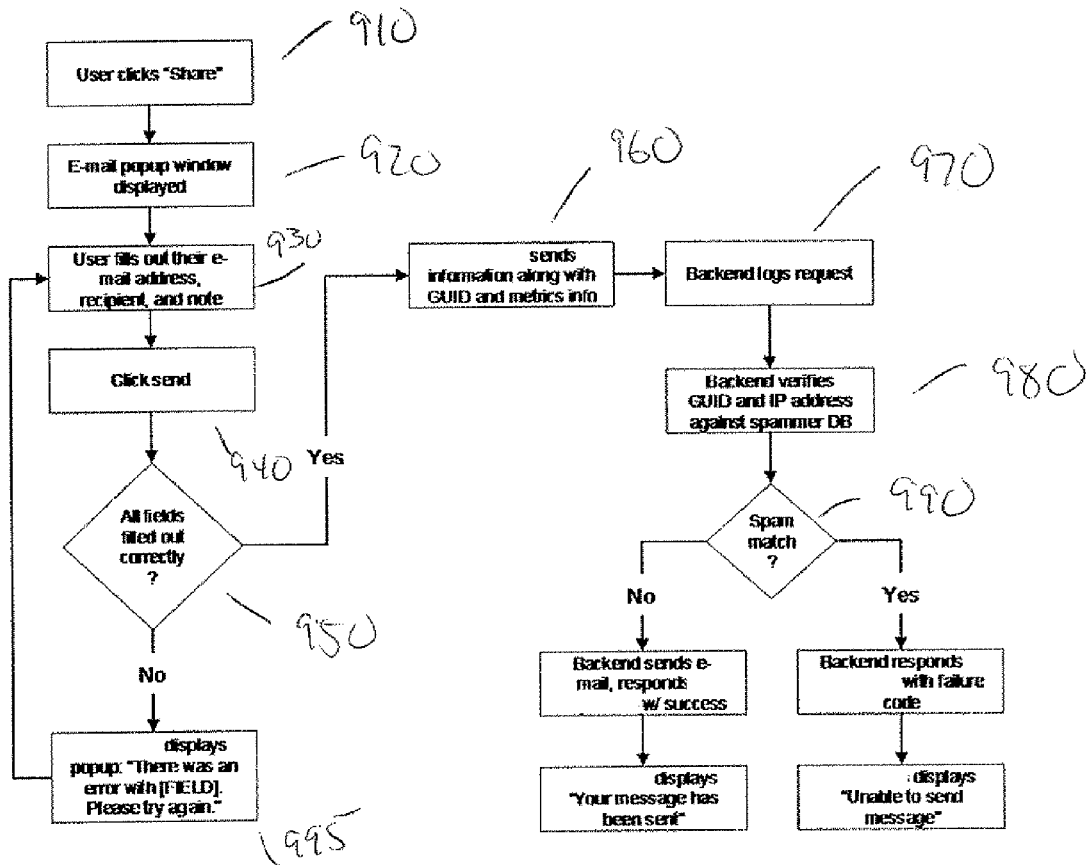
FIG. 9B illustrates the operation of a "share" function in order to email a video from within a standalone media player.
FIG. 9C illustrates an email message received by a recipient of the sharing action.

FIG. 9B illustrates the operation of a "share" function in order to email a video from within a standalone media player. Additional information may also be shared through this methodology, the additional information may include but not being limited to the original URL for the media file, the feed URL for the show where the media file originated, the title of the show, the title of the media file, and a subject and message included by the user.

In step 910, a user clicks on a share button, which may be similar to the button illustrated in FIG. 9A. A window is then launched in step 920 whereby a user is prompted to provide information for e-mailing the video or other content. In many instances, the content itself is not sent due to bandwidth constraints. Instead, a link identifying and allowing for access to the content is sent. The user fills out the form in step 930 including an e-mail address of the recipient, that of the user, and/or a note for the recipient that is to accompany to the content being delivered to the recipient. The message is sent through the clicking of a send button on step 940. Instead of an e-mail address, other forms of contact information may be used including an instant messaging address or cell phone number.

If all fields from the popup window displayed in step 920 are determined to have been correctly filled out at step 950, the message is sent in step 960 along with a Globally Unique Identifier (GUID) and metrics information. The GUID information is requested by a backend log in step 970. The GUTID and IP address of sender may be applied against a spam database in step 980 such that a determination may be made at step 990 as to whether the message being sent is legitimate or unwanted spam. If the message is determined to be spam, delivery fails and a corresponding delivery failure message is displayed. If the message is determined not to be spam, then the content and corresponding message is sent along with an indication that delivery is successful.

Returning to step 950, if it is determined that all fields have not been correctly filled out (e.g., an email address of the recipient or sender is omitted), then the process returns to step 930 to correct the erroneous information. An indication as to the error might be reflected in step 995. Different fields may be necessary to allow for delivery of content or a link to the same. Other fields may be optional whereby incorrectly provided information does not otherwise prevent delivery of the content.

As noted above, additional information may be sent with a media file or a link thereto. Additional information may be obtained by parsing the media file and extracting information from the metadata within the media file. The additional information may also be obtained by parsing the RSS feed from which the media file originated or receiving the information directly from the user. The additional information could also be obtained by using any combination of the three methods. Once the additional information is obtained, the system may share the media file and information in a manner similar to that described above in FIG. 9B.

FIG. 9C illustrates an email message received by a recipient of the sharing action. The message could include links to play back the media file as well as a link to report that the shared media was received in error by the recipient user. Before sending the media file and additional information to the recipient, the information can be formatted to be properly displayed on the recipient user's device. If the recipient address was an email address, the information could be formatted to include a snapshot from the video file along with a link to view the media file in a web browser. In another example, the message could be formatted to embed a video player so that the recipient user could directly view the media file in the message. A URL link to a page containing the embedded shared media could also be sent to the recipient. The recipient may be able to view the shared media within an embedded media player contained in a web browser.

Figure 10:
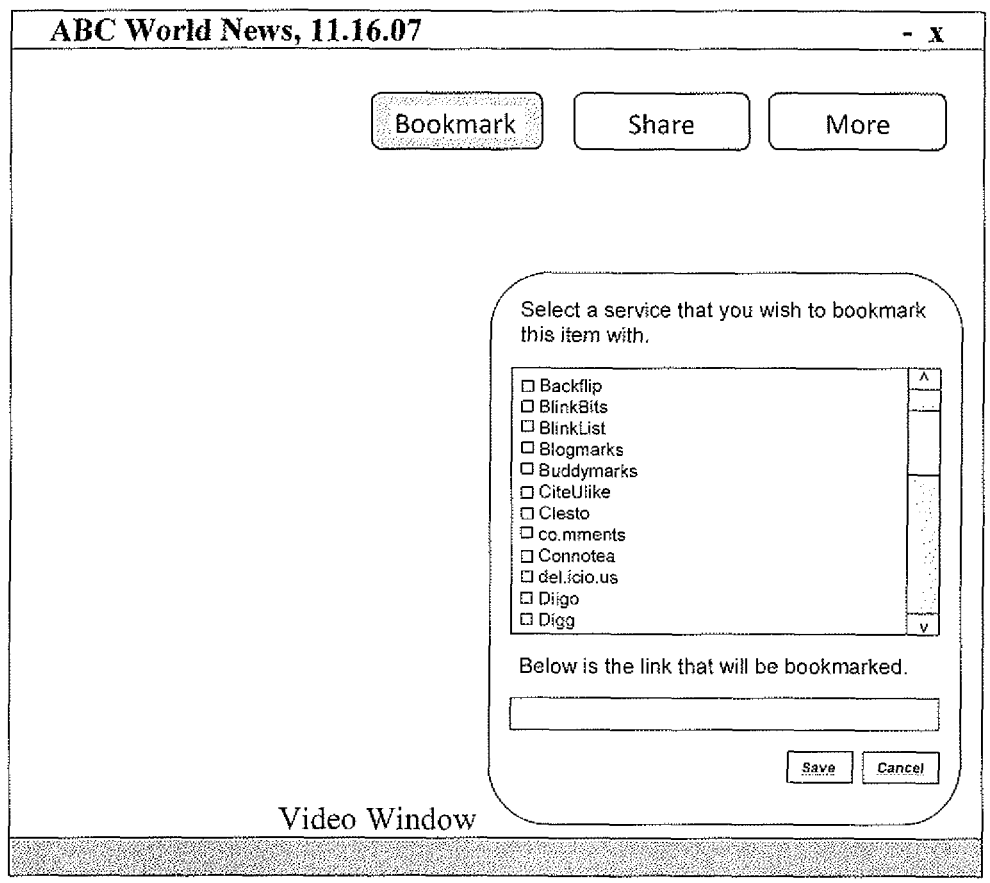
FIG. 10 illustrates a three-button-companion graphical user interface to the user, specifically a highlighted "bookmark" button.

FIG. 10 illustrates a three-button companion graphical user interface to a user, specifically a highlighted "bookmark" button. Bookmarking the content file and/or additional information allows for the content and information to be bookmarked to one or more social bookmarking websites. The additional information can include but is not limited to the original URL for the media file, the feed URL for the show from where the media file originated, the title of the show, the title of the media file, tags associated with the media file or show, or a message included by the user. Additional information may be obtained by utilizing any of the aforementioned methodologies including parsing the media file or the RSS feed as well as receiving information directly from a user.

Through the interface of FIG. 9C, the user may select one or more social bookmarking websites on which to bookmark the media file and additional information. The system determines the parameters that need to be passed to each site in order to allow the information to be bookmarked properly. When the user is on-line, the information can be sent directly to the social bookmarking site using the network. When the user is off-line, the system can cache the information to be sent when the user returns to an on-line state. Examples of social bookmarking sites include but are not limited to Digg, Google Bookmarks, and StumpleUpon.

Once placed on the social bookmarking site, the bookmark enables the user or other users to directly download the media file without first requiring the RSS feed or show subscription. The bookmark also enables users to gain access to media files that have since been removed from the RSS feed. In another related embodiment, embed code may be generated with information extracted from parsing the RSS file or the media file. The embed code, when manually pasted or automatically uploaded to a personal user profile page on a social media site, a web media player containing the embed video is generated at the social media site. Examples of social media sites include but are not limited to Facebook, Myspace and Tagged. The user may be required to input login and password information for their social network account in order to upload the content or information.

Figure 11:
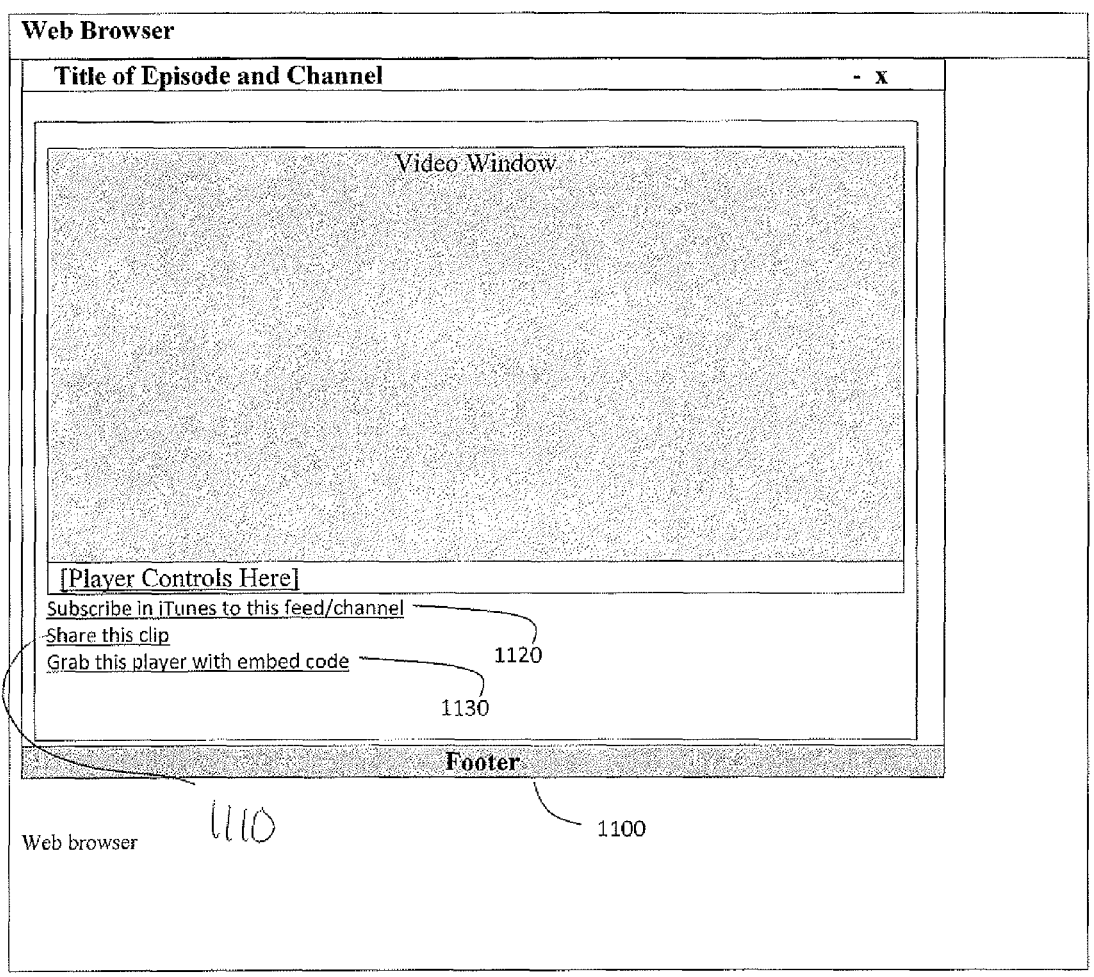
FIG. 11 illustrates an instance of an online video player embedded in a web browser, where the player allows the user to further share or subscribe to the video, in addition to playing the video.

FIG. 11 illustrates an instance of an online video player 1100 embedded in a web browser, where the player allows the user to further share or subscribe to the video, in addition to playing the video. To view video within such a web media player 1100, a user is not required to install a standalone media player or the plug-in software. An online embedded video player 1100 as illustrated in FIG. 11 contains certain viral sharing features as 'built in' functions whereby users may invite other users to view the video or embed the video on their social media personal profile pages. The embedding of the video may be accomplished manually or automatically by copying the embed code 1130 and pasting it in social media profile pages.

FIG. 11 also illustrates an additional feature allowing web users to get the channel feed as a subscription download 1120. This feature may prove useful for those users that prefer to have the media automatically downloaded to their device on a periodic basis instead of having to actually visit websites to receive periodic updates to content of their interest. Downloaded content is consumed using a standalone media player such as iTunes® and can become portable on non-networked portable media devices such as the iPod allowing usage even while a user is offline.

In one exemplary embodiment, users may share their favorite videos with friends and family via email using the 'share this clip' link 1110. In another embodiment, users may embed the web media player 1100 containing episodes and channels they wish to share with friends, family, and visitors to their profile pages from within the standalone media player running on the user device. This may be accomplished by automatically writing the related embed code or bookmark links to the users profile page. The user may be required to input login and password information for their social network account. These sharing mechanisms enable viral discovery of media and fast adoption of popular media because of user-to-user remarketing.

Computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

TABLE A

```
<!-- Copy and Paste this javascript in your page in the <head? section to display the 'Get Podcast'
button -
<script type="text/javascript" language="javascript"
src="http://plugins.volomedia.com/new_agent/button_header.js"></script>
<!-- When a link to subscribe to a podcast is to be displayed somewhere on the page, the
following HTML element
<!-- that calls the VoloMediaSubscribe function in it's onClick handler should be coded as follows:
<a href='javascript:;' onClick="VoloMediaSubscribe('http://podcasts.nbc.com/nightly_news.xml',
'NBC Nightly News',
'http://podcasts.nbc.com/images/msnbc_logo.png','http://www.myanalytics.com/ma.js',
'http://www.podcasts.nbc.com');return false;">Get Podcast
</a>
```

TABLE A-continued

```
// Create the VoloMedia Url Array
var voloUrlArray = new Array( );
var voloReportServer = "http://ticks.podbridge.com";
var voloImageServer = "http://plugins.volomedia.com/new_agent";
var voloScriptServer = "http://plugins.volomedia.com/new_agent";
var voloDefaultOfferUrl = "http://www.volomedia.com/rss/plugin-download-video.xml";
var voloJSRelease = "new_agent";
var voloJSVersion = "1.2";
var voloClientID = VoloGenerateGUID( );
function VoloS4( )
{
    return (((1+Math.random( ))*0x10000)|0).toString(16).substring(1);
}
// Function to help generate a pseudo unique client id
function VoloGenerateGUID( )
{
         return (VoloS4( )+VoloS4( )+"-"+VoloS4( )+"-"+VoloS4( )+"-"+VoloS4( )+"-
"+VoloS4( )+VoloS4( )+VoloS4( ));
}
// Push a VoloMedia Url onto the array stack. These urls will be called once the agent is accessible
function VoloPushUrl(url)
{
         // First check to see if this exact url is already in the stack
         var found = false;
         for ( i = 0; i < voloUrlArray.length; i++ )
         {
                  if ( voloUrlArray[i] == url )
                  {
                           found = true;
                           break;
                  }
         }
         if ( !found )
                  voloUrlArray.push(url);
}
function VoloReportEvent( )
{
         // This function is going to accept a variable number of arguments in the following
order
         // event -> the string representing the event type
         // channel -> the url for the feed or channel that was requested
         // client_id -> a unique id to represent this client
         // referrer -> the referring page for this code.
         var voloEvent = null;
         var voloChannel = null;
         var voloClient_ID = null;
         var voloReferrer = null;
         // at the very least we need an event argument
         if ( arguments.length < 1 )
                  return;
         voloEvent = arguments[0];
         if ( arguments.length > 1 )
                  voloChannel = encodeURIComponent(arguments[1]);
         if ( arguments.length > 2 )
                  voloClient_ID = arguments[2];
         else
                  voloClient_ID = voloClientID;
         if ( arguments.length > 3 )
                  voloReferrer = encodeURIComponent(arguments[3]);
         else
                  voloReferrer = encodeURIComponent(document.location);
         var id = "voloImg";
         var voloBodyLoc = document.getElementsByTagName("body").item(0);
         // Cleanup so we aren't littering the DOM with new elements
         var imgObj = document.getElementById(id);
         if ( null != imgObj )
                  voloBodyLoc.removeChild(imgObj);
         var voloReportUrl = voloReportServer + "/vm.gif";
         var voloImgObj = document.createElement("img");
         var voloRand = parseInt(Math.random( )*99999999); // random number to get around
caching issues
         voloReportUrl += "?event=" + voloEvent;
         if ( voloReferrer != null )
                  voloReportUrl += "&referrer=" + voloReferrer;
         voloReportUrl += "&rand=" + voloRand;
         if ( voloChannel != null )
                  voloReportUrl += "&channel_url=" + voloChannel;
         if ( voloClient_ID != null )
                  voloReportUrl += "&client_id=" + voloClient_ID;
```

TABLE A-continued

```
            voloReportUrl += "&PBver=" + voloJSRelease;
            voloReportUrl += "&PV_jsVer=" + voloJSVersion;
            voloImgObj.setAttribute("src", voloReportUrl);
            voloImgObj.setAttribute("id", id);
            voloBodyLoc.appendChild(voloImgObj);
            //alert("calling report url: " + voloReportUrl);
}
function VoloCallUrl(url)
{
            //alert("calling url: " + url);
            var id = "voloAgentScript";
            var voloHeadLoc = document.getElementsByTagName("head").item(0);
            // Cleanup so we aren't littering the DOM with new elements
            var scriptObj = document.getElementById(id);
            if ( null != scriptObj )
                        voloHeadLoc.removeChild(scriptObj);
            var voloScriptObj = document.createElement("script");
    // Add script object attributes
    voloScriptObj.setAttribute("type", "text/javascript");
    voloScriptObj.setAttribute("src", url);
    voloScriptObj.setAttribute("language", "javascript");
    voloScriptObj.setAttribute("id", id);
    voloHeadLoc.appendChild(voloScriptObj);
}
function VoloPingAgent( )
{
            var voloUrl = "http://127.0.0.1:10930/?cmd=Ping&ret=js";
            //alert("Ping Agent: " + voloUrl);
            VoloCallUrl(voloUrl);
}
function VoloIsAgentInstalled( )
{
            return ( typeof(volomediaVersion) != "undefined" );
}
function VoloIsMac( )
{
  return navigator.userAgent.toLowerCase( ).indexOf("mac") != −1;
}
function VoloIsWindows( )
{
            return navigator.userAgent.toLowerCase( ).indexOf("windows") != −1;
}
function VoloIsSupported( )
{
            // Only Mac and Windows are supported at this time
            //return (VoloIsMac( ) | | VoloIsWindows( ));
            return VoloIsWindows( );
}
function VoloMediaSubscribe(url, title, logo)
{
  if ( typeof(url) == "undefined" )
                        return false;
            VoloReportEvent("GPC", url);
  if ( !VoloIsSupported( ) )
  {
                     // navigate to itpc://
    if (url.indexOf("http://") == 0) //replace with itpc
       url = url.replace("http://", "itpc://");
                        else if (url.indexOf("HTTP://") == 0) //replace with itpc
       url = url.replace("HTTP://", "itpc://");
    else
       url = "itpc://" + url;
    window.location = url;
    return false;
  }
  var request = "";
  if ( VoloIsAgentInstalled( ) ) // Subscribe for an RSS feed
            {
                        request = "http://127.0.0.1:10930/?cmd=Subscribe&ret=js";
            }
            else    // Install and subscribe for an RSS feed
            {
                        request = voloScriptServer + "/install_popup.php?cmd=Install";
                        VoloReportEvent("DPV", url);
            }
            if ( logo != undefined )
                        request += "&logo=" + encodeURIComponent(logo);
            if ( title != undefined )
                        request += "&title=" + encodeURIComponent(title);
```

TABLE A-continued

```
        if ( url != undefined )
                request += "&url=" + encodeURIComponent(url);
        // add the client id and referrer to the url
        request += "&client_id=" + voloClientID;
        request += "&referrer=" + encodeURIComponent(document.location);
        VoloCallUrl(request);
        return false;
}
function VoloMediaSubscribeOffer(url, title, logo, offer_url)
{
        if ( !VoloIsAgentInstalled( ) )
        {
                if ( typeof(offer_url) == "undefined" )
                        offer_url = voloDefaultOfferUrl;
                encoded_offer_url = encodeURIComponent(offer_url);
                push_url = 'http://127.0.0.1:10930/?cmd=Subscribe&url=' +
encoded_offer_url;
                VoloPushUrl(push_url);
                VoloMediaSubscribe(url, title, logo);
        }
        else
        {
                VoloMediaSubscribe(url, title, logo);
        }
        return false;
}
function VoloLaunchUrls( )
{
        if ( VoloIsAgentInstalled( ) )
        {
                //alert("Check Agent is launch urls: " + voloUrlArray);
                // Check if there are any subscriptions that need to go out
                while ( voloUrlArray.length > 0 )
                {
                        var url = voloUrlArray.shift( );
                        //alert("Add Url: " + url);
                        VoloCallUrl(url);
                }
        }
        else
        {
                //alert("Agent isn't running");
                setTimeout("VoloCheckAgent( )", 2000);
        }
}
function VoloCheckAgent( )
{
        //alert("VoloCheckAgent");
        volomediaVersion = undefined;
        VoloPingAgent( );
        if ( voloUrlArray.length > 0 )
        {
                // set a timeout to check the agent
                setTimeout("VoloLaunchUrls( )", 500);
        }
}
// Ping the agent to see if it's running
VoloPingAgent( );
```

What is claimed is:

1. A method for analyzing episodic media consumption, the method comprising:

receiving an episodic media file at a client device communicatively coupled to a server hosting the episodic media file, wherein a set of advertisements is inserted in the episodic media file, each advertisement in the set inserted at a different insertion location in the episodic media file, and wherein the client device subsequently goes off-line;

executing instructions stored in memory of the client device to:

allow for the consumption of at least part of the episodic media file at the client device when the client device is off-line, wherein a duration of the consumed part of the episodic media file is indicated by a playback log;

determine which advertisements in the set were consumed off-line based on the duration of the consumed part of the episodic media file indicated by the playback log and the different insertion locations within the episodic media file;

cache the information to be sent when the client device returns to an on-line state; and determine that the client device has returned to an on-line state;

transmitting a recommendation that a third-party acquire the episodic media via a social media application executing at or accessible to the client device; and reporting statistics related to the off-line consumption of the received episodic media, advertisements determined to have been consumed off-line, and the recommendation as to third-party acquisition of the episodic media to the publisher of the episodic media.

2. The method of claim 1, further comprising receiving a recommendation as to an additional episodic media file from the host of the episodic media file, wherein the recommendation is based upon the reported statistics as to consumption and recommendation of the episodic media file to the third-party.

3. The method of claim 1, further comprising receiving a recommendation as to an additional episodic media file from the publisher of the episodic media file, wherein the recommendation is based upon the reported statistics as to consumption and recommendation of the episodic media file to the third-party.

4. The method of claim 2, wherein the statistical based recommendation as to the additional episodic media file follows analysis of the reported statistics by a party other than the host of the episodic media file.

5. The method of claim 3, wherein the statistical based recommendation as to the additional episodic media file follows analysis of the reported statistics by a party other than the provider of the episodic media file.

6. The method of claim 2, wherein the statistical based recommendation further complies with rule for receipt of the episodic media file and associated with a user of the client device.

7. The method of claim 3, wherein the statistical based recommendation further complies with a rule for receipt of the episodic media file and associated with a user of the client device.

8. The method of claim 1, wherein the social media application is a bookmarking application.

9. The method of claim 1, wherein the social media application includes a content player.

10. The method of claim 1, wherein the social media application includes a plug in executing at the client device.

11. A system for analyzing episodic media consumption, the system comprising:
a server hosting a plurality of episodic media files;
a first client device that receives an episodic media file from the server over a communications network, wherein a set of advertisements is inserted in the episodic media file, each advertisement in the set inserted at a different insertion location in the episodic media file, and wherein the first client device subsequently goes off-line, the first client device being further capable of:
  playback of at least part of the episodic media file when the client device is off-line, wherein a duration of the played part of the episodic media file is indicated by a playback log,
  determination of which advertisements in the set were consumed off-line based on the duration of the played part of the episodic media file indicated by the playback log and the different insertion locations within the episodic media file;
  caching the information to be sent when the client device returns to an on-line state; and
  determining that the client device has returned to an on-line state;
a second client device that receives a recommendation as to the episodic media file from the first client device, the first and second client device communicatively coupled with a communications network; and
a computing device that receives statistics from at least the first client concerning the episodic media, the statistics including information concerning the off-line playback of part of the episodic media file, the advertisements determined to have been consumed off-line, and the recommendation of the episodic media to the second client device.

12. The system of claim 11, wherein the second client device receives the recommendation from the first client device by way of a social media application, the social media application hosted at an intermediate computing device accessible by both the first and second client device.

13. The system of claim 11, wherein the second client device receives the recommendation from the first client device by way of a social media application that is executing at both the first and second client device.

14. A non-transitory computer-readable storage medium, having embodied thereon a program executable by a processor to perform a method for analyzing episodic media consumption, the method comprising:
receiving an episodic media file at a client device communicatively coupled to a server hosting the episodic media file, wherein a set of advertisements is inserted in the episodic media file, each advertisement in the set inserted at a different insertion location in the episodic media file, and wherein the first client device subsequently goes off-line;
executing instructions stored in memory of the client device to:
  allow for the consumption of at least part of the consuming episodic media at the client device when the client device is off-line, wherein a duration of the consumed part of the episodic media file is indicated by a playback log;
  determine which advertisements in the set were consumed off-line based on the duration of the consumed part of the episodic media file indicated by the playback log and the different insertion locations within the episodic media file;
  cache the information to be sent when the client device returns to an on-line state; and
  determine that the client device has returned to an on-line state;
transmitting a recommendation that a third-party acquire the episodic media via a social media application executing at or accessible to the client device; and
reporting statistics related to the off-line consumption of the received episodic media, advertisements determined to have been consumed off-line, and the recommendation as to third-party acquisition of the episodic media to the publisher of the episodic media.

15. The method of claim 1, wherein the third-party requests the episodic media file following transmission of the recommendation and wherein a different set of advertisements is inserted in the episodic media file delivered to the third-party.

16. The system of claim 11, wherein the second client device requests the episodic media file following receipt of the recommendation and wherein a different set of advertisements is inserted in the episodic media file delivered to the second client device.

* * * * *